(12) United States Patent (10) Patent No.: US 7,591,628 B2
Noonan et al. (45) Date of Patent: Sep. 22, 2009

(54) HANDLING AND ORIENTING COTTON MODULES WRAPPED WITH MATERIAL INCLUDING RFID TAG

(75) Inventors: James Thomas Noonan, Boundurant, IA (US); Timothy Arthur Deutsch, Newton, IA (US); Jerry Bob Hall, Johnston, IA (US); Donald Lee Goodrich, Waterloo, IA (US)

(73) Assignee: Deere & Company, Moline, IL (US)

( * ) Notice: Subject to any disclaimer, the term of this patent is extended or adjusted under 35 U.S.C. 154(b) by 22 days.

(21) Appl. No.: 11/928,240

(22) Filed: Oct. 30, 2007

(65) Prior Publication Data

US 2009/0107348 A1 Apr. 30, 2009

(51) Int. Cl.
*B65B 69/00* (2006.01)

(52) U.S. Cl. ................. 414/607; 414/303; 414/412; 100/89

(58) Field of Classification Search ........... 100/4, 100/5, 6, 7, 87, 88, 89; 56/341; 53/587; 414/24.5, 412, 607, 301, 303
See application file for complete search history.

(56) References Cited

U.S. PATENT DOCUMENTS

| | | | | |
|---|---|---|---|---|
| 4,779,526 A * | 10/1988 | Frerich et al. | ........... | 100/5 |
| 5,090,864 A * | 2/1992 | Leifeld | ........... | 414/412 |
| 5,318,399 A * | 6/1994 | Marom | ........... | 414/412 |
| 5,979,141 A * | 11/1999 | Phillips | ........... | 53/389.2 |
| 6,176,531 B1 * | 1/2001 | Wheeler | ........... | 294/88 |
| 6,263,650 B1 * | 7/2001 | Deutsch et al. | ........... | 56/16.4 B |
| 6,332,426 B1 * | 12/2001 | van den Berg | ........... | 119/51.01 |
| 7,165,928 B2 * | 1/2007 | Haverdink et al. | ........... | 414/412 |
| 2003/0115841 A1 * | 6/2003 | Davis et al. | ........... | 53/587 |

* cited by examiner

*Primary Examiner*—Jimmy T Nguyen

(57) ABSTRACT

A grapple device is provided for handling cylindrical cotton modules each having its circumference wrapped with a length of plastic sheet wrapping material. The grapple is equipped with a RFID reader for determining the location of a loose inner tail section of the wrapping material to which is attached an RFID tag assembly. The grapple device is also equipped with powered rollers which can be driven so as to cause the cotton module to be rotated about its axis so as to position the loose tail section of the wrapping material at an upper location of the module so as to permit a bottom surface location of the module to be slit by operation of a cutting device so as to release the cotton from the wrapper when the cotton module is positioned over a conveyor floor of a cotton gin. The powered rollers are then driven to aid in the removal and collection of the of the wrapping material from the module. In one embodiment, a separate set of powered rollers are provided for removing the wrapping material.

11 Claims, 14 Drawing Sheets

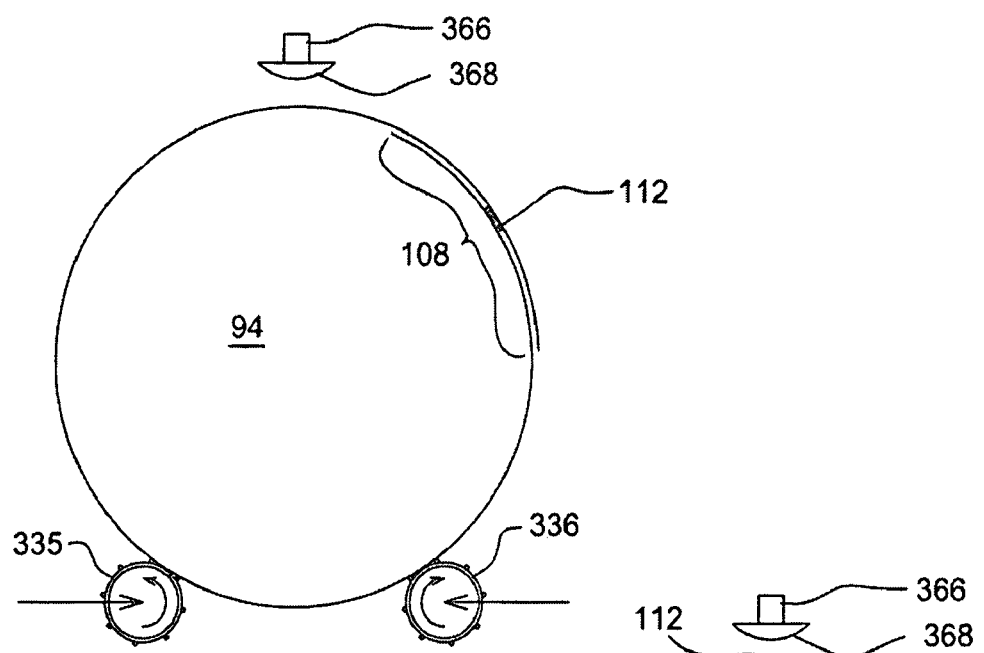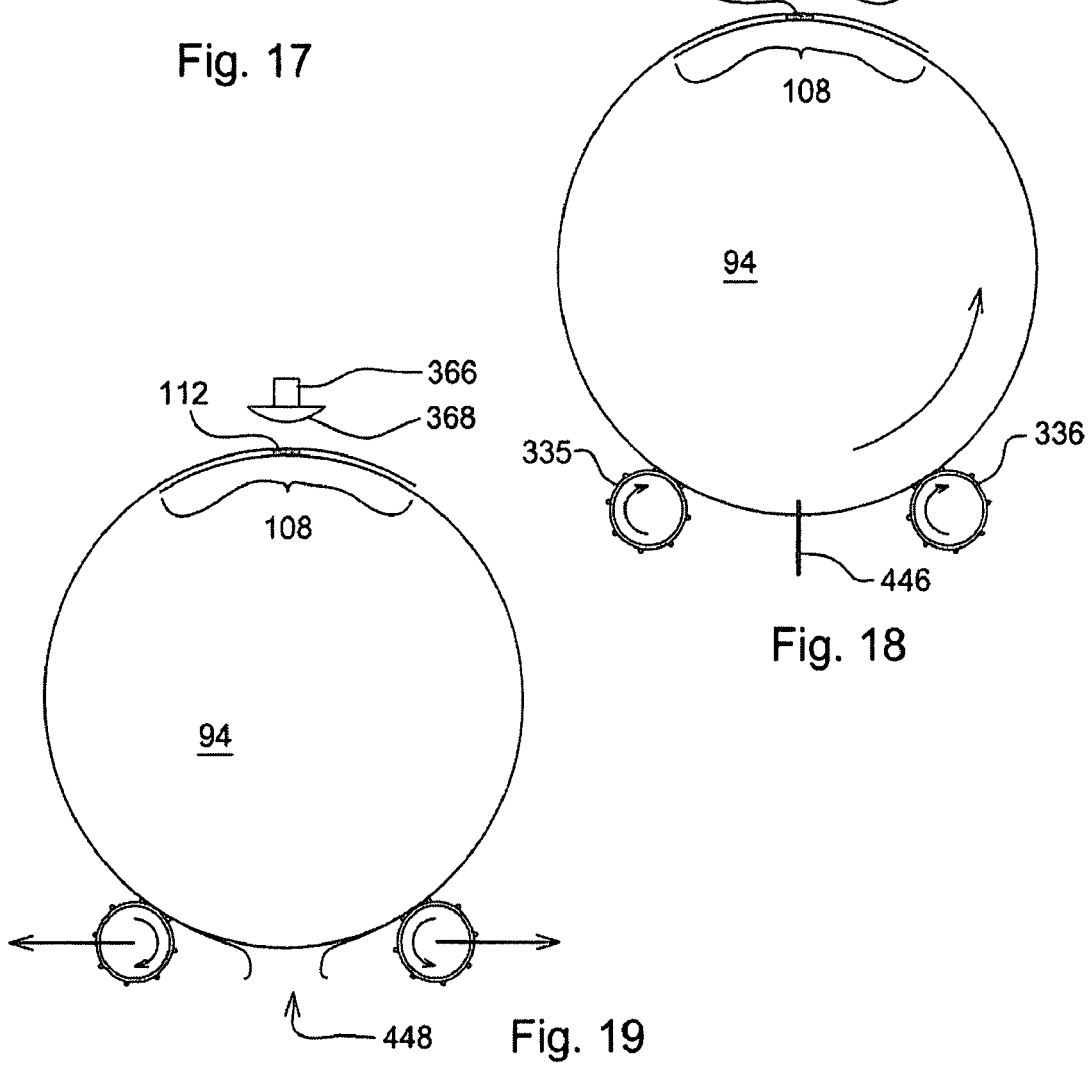
Fig. 17
Fig. 18
Fig. 19

HANDLING AND ORIENTING COTTON MODULES WRAPPED WITH MATERIAL INCLUDING RFID TAG

FIELD OF THE INVENTION

The present invention relates to bale or module handling devices, and more particularly relates to cotton module handling devices capable of placing the modules in a predetermined orientation about their longitudinal axes which is desirable when removing a protective wrapping of plastic sheet material from the modules for releasing the contained cotton on a cotton feeder floor at a cotton gin.

BACKGROUND OF THE INVENTION

A recent development in the harvesting of seed cotton has been to incorporate a module former and module wrapping apparatus in the seed cotton boll harvesting machine, with the module former and module wrapping apparatus forming cotton collected from the boils into a large cylindrical module or bale and wrapping the module with a sheet of plastic wrapping material, for example, before the cotton module is ejected onto the ground. These modules are grouped or staged in the field, generally in end-to-end relationship to each other and in a number (usually four or more) equal to that required for loading a given transport truck or trailer used to transport the modules to the cotton gin. U.S. Pat. No. 6,263,650, granted 24 July 24, discloses a cotton harvester equipped with such a module former and module wrapping apparatus.

Once at the gin, it is necessary to remove the wrapping material from the module. A low cost means for removing the plastic wrapping material from the module is desired as part of processing the module on the feeder floor of the gin. While large gins may opt for a somewhat expensive automated means for removing the plastic wrap from the modules, in the case of smaller gins, there is a need for a lower cost means, including manual removal if such is of lower cost than the capital costs of installing machinery for automating the wrap removal step. U.S. Pat. No. 7,165,928, which was granted on 23 Jan. 2007, discloses a low cost wrap removal arrangement wherein a fork attachment is mounted to a loader boom structure of a front end loader, with the loader being operable to elevate a wrapped cylindrical cotton module and slit the bottom of the wrapper generally parallel to the longitudinal axis of the module by moving the loader and loaded module relative to a fixed knife located at one end of a roller conveyor forming the cotton feeder floor and with the fork attachment including a spear member which is inserted at the top of the module between the wrap and the module, whereby the plastic wrapper becomes suspended from the spear once cotton has flowed out through the slit cut in the bottom of the wrapper.

A further problem associated with removing wrapping material, as set forth in the aforementioned patent, is that when the module is wrapped, there is an inner tail section of the wrapping material which is not bonded to the next adjoining layer of the wrapping material. Thus, if this loose inner tail section of the plastic wrapping material is located at the bottom of the wrapped module when the wrapping material is cut during placement of the module on the conveying or feeder floor of the gin, then there is a likelihood that the loose inner tail section will be severed from the remainder of the wrapping material and fall onto the conveying floor with the cotton, thus contaminating the cotton that goes into the gin.

The problem to be solved then is to provide a way for ensuring that a wrapped module is properly oriented, prior to slitting the wrapper at the bottom of the module during depositing the module of cotton on the gin conveyor floor, so that the inner tail section of the wrapping material is displaced from the cutting zone and remains joined as a part of the wrapping material formerly encasing the cotton module.

SUMMARY OF THE INVENTION

According to the present invention there is provided a cylindrical module handling device which overcomes the disadvantages of the aforementioned patented device for handling wrapped cylindrical cotton modules.

An object of the invention is to provide a cylindrical module handling apparatus having the ability for selectively rotating a wrapped cylindrical module about its longitudinal axis so as to place a loose inner tail section of the plastic wrapping material in a more favorable location for having the wrapper removed by slitting it along a line extending parallel to the axis of the module.

This aforementioned object is achieved by providing a device for handling cylindrical modules, the handling device including powered rollers placed so as to support the cylindrical module and rotate the module about its longitudinal axis. In addition, it is possible to use these powered rollers for removing the wrapping material from the module after the wrapper has been cut.

To aid the operator of the loader, tractor or other mobile device carrying the module handling device in knowing the location of the loose inner tail section of the wrapping material, it is proposed to place a radio frequency identification (RFID) tag on the module in the vicinity of the loose inner tail section of the wrapping material and to provide the module handling device with a tag reader mounted so as to be above the module when the latter is supported on the powered rollers, with the powered rollers of the module handling device being appropriately operated to turn the module until the RFID tag is sensed by the RFID reader, which is in communication with a computer located on-board the tractor or other mobile device.

It is most convenient if the RFID tags are applied to the formed cylindrical modules at the time they are wrapped by the wrapping mechanism associated with the module-forming device that is incorporated in the seed cotton boll harvesting machine. One way of accomplishing this is to attach at least one RFID tag to each of a plurality of predetermined lengths of the plastic wrapping material during the manufacture of supply rolls of the material, with the RFID tag being located on that portion of a given length that will become the loose inner tail section when the predetermined length is wrapped about a module of a predetermined size formed in the module-forming chamber. Redundant tags may be located at each location so that identification of the module can still be obtained with an RFID reader even if one of the set of tags is non-functional.

A side benefit of providing wrapped modules with RFID tags is that such tags may also be provided with information for automatically tracing the formed modules along with associated information about the module. For example, such associated information might include grower name, field number, seed variety, weight, average yield where module is produced, module diameter, moisture content, GPS location and associated mapping capability, with the associated information being compiled by a computer receiving data from various sensors and a GPS module provided on the cotton harvesting machine, for example. The grower name is important for the gin operator to know so that the grower will be paid appropriately for the quantity and quality of the cotton brought in by the grower.

With the pre-placement of the RFID tag assemblies on the wrap, RFID reader technology can be used at any point where the cotton modules are staged, moved, weighed, temporarily stored, and during processing at the seed cotton gin. Because of the redundancy and ease of readability of the tag assemblies, the currently employed process of manually adding and removing identification tags can be eliminated for labor savings and reduction of the possibility of human error.

BRIEF DESCRIPTION OF THE DRAWINGS

FIG. 17 is a schematic front view showing a wrapped module being engaged from opposites by, and lifted for support upon the pair of powered rollers, which are counter-rotated FIG. 18 is a schematic front view like FIG. 17, but showing a wrapped module supported on the fork rollers, with the rollers being driven for causing the module to be rotated for placing the inner loose tail of the wrapper at the 12:00 o'clock position prior to the wrapper being slit by a cutting blade located at the 6:00 o'clock position.

FIG. 19 is a view like FIG. 17 with the module support rollers now being driven for stripping the wrapper from the module as the rollers are spread apart.

DESCRIPTION OF THE PREFERRED EMBODIMENT

Figure 1:
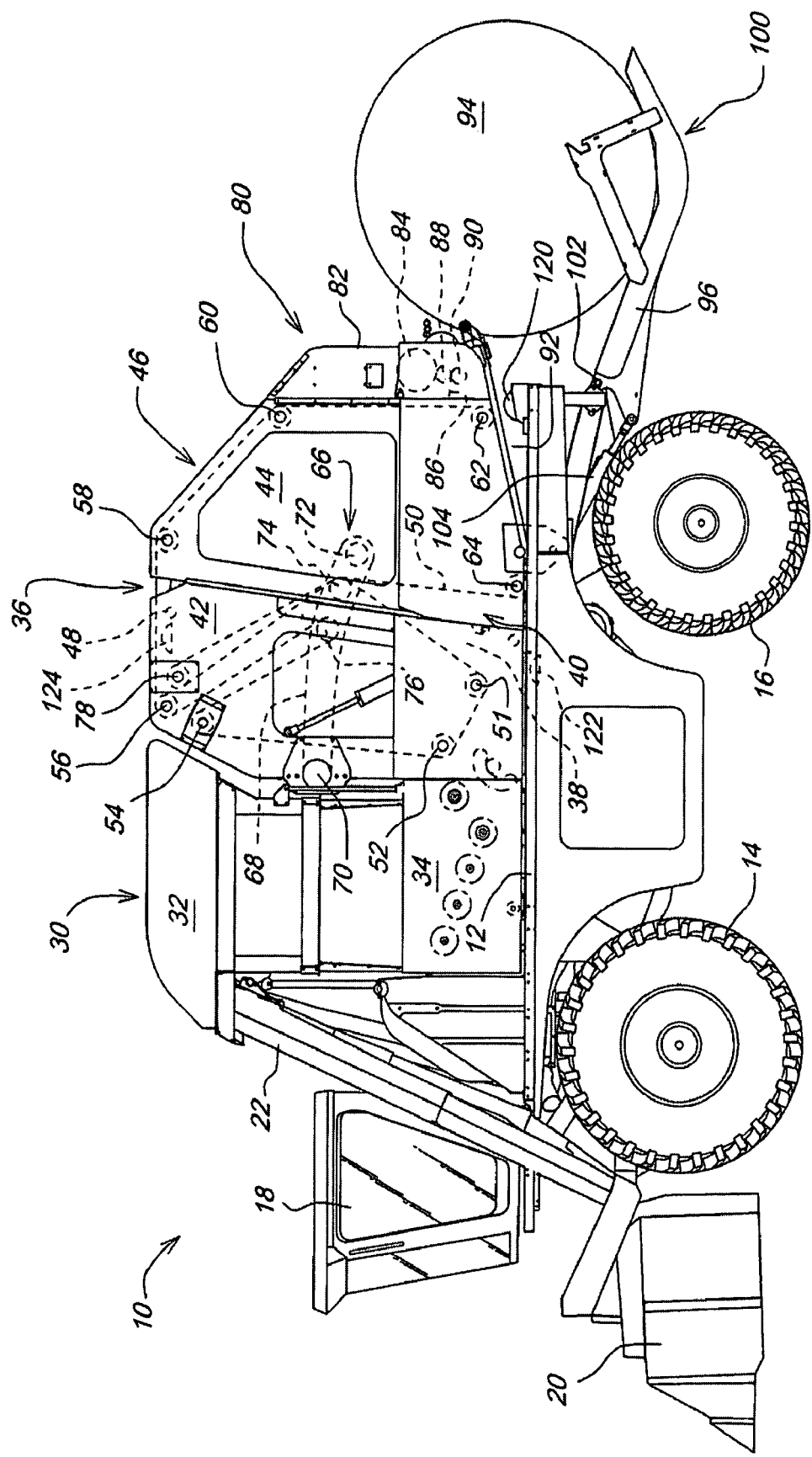
FIG. 1 is a schematic left side view of a seed cotton harvesting machine incorporating a baling device equipped with a wrapping apparatus for wrapping a cylindrical cotton module formed in the baling chamber.

Referring now to FIG. 1, there is shown a self-propelled cotton harvester 10 including a main frame 12 supported for movement by forward drive wheels 14 and rear steerable wheels 16. An operator's station or cab 18 is supported at a forward location on an elevated region of the frame so as to provide an operator a clear view of a cotton harvesting head 20 mounted to a forward end of the frame 12, which removes cotton from plants and directs the removed cotton into an air conveying system including an air duct arrangement 22.

An upright cotton accumulator arrangement 30 with an upper inlet structure 32 and a metering floor 34 is supported on the frame 12 behind the cab 18 for receiving the cotton from the air duct arrangement 22. A selectively operable cotton processor which, as shown, is a large cylindrical module or bale former 36 supported rearward of the accumulator arrangement 30. The accumulator arrangement 30 stores cotton as necessary, and the metering floor 34 uniformly distributes the cotton into a module-forming chamber 38, by way of a chamber inlet 40.

The module-forming chamber 38 is broadly similar to the bale-forming arrangement of the large round baler disclosed in U.S. Pat. No. 5,979,141, granted 9 Nov. 1999, in that it includes opposite sides having a forward region defined by a pair fixed, transversely spaced side walls 42, which are joined to the main frame 12, and a rear region defined by a pair of transversely spaced side walls 44 that form opposite sides of a discharge gate 46, which is mounted to an upper rear location of the fixed side walls 42 for pivoting vertically about a horizontal axis defined by a pivot assembly 48, between a lowered, module-forming position, as shown, and a raised module-discharge position. The circumference of the module-forming chamber 38 is defined by a module-forming arrangement including a plurality of endless belts 50 supported in side-by-side relationship across a support roll arrangement comprising a plurality of fixed rolls and a plurality of movable rolls. Specifically, proceeding clockwise from an upper boundary of the chamber inlet 40, the fixed rolls include a bottom front roll 51, a lower front roll 52, an upper front roll 54, and a top front roll 56 all extending between and having opposite ends rotatably mounted to the fixed side walls 42. Continuing on, the fixed rolls further include a top front gate roll 58, an upper rear roll 60 a bottom rear gate roll 62 and a bottom front gate roll 64 all extending between and having opposite ends rotatably mounted to the gate side walls 44. A belt tensioning arm arrangement 66 comprises a pair of transversely spaced arms 68 having forward ends joined to a transverse tube that extends between, and is pivotally mounted, as at a pivot arrangement 70, to a middle front region of the fixed side walls 42. The plurality of movable rolls comprise three rolls 72, 74 and 76, which extend between and have opposite ends respectively rotatably mounted to the arms 68 of the tensioning arm arrangement 66. The roll 72 is located at a rear end of the arms 68, the roll 74 positioned in adjacent spaced relationship to the roll 72, and the roll 76 is spaced toward the pivot arrangement 70 from the roll 74.

Beginning at the bottom front roll 51, the endless, module-forming belts 50 are looped under the roll 51 and include an outer run which is engaged serially with the lower front roll 52, the upper front roll 54, the movable roll 76, the top front roll 56, the top front gate roll 58, the upper rear gate roll 60, the lower rear gate roll 62, and the lower front gate roll 64. An inner run of the belts 50 includes a loop engaged over a top rear fixed roll 78, which extends between an upper rear region of the fixed side walls 42, with the loop being positioned between the movable rolls 72 and 74. As shown, the tensioning arm arrangement 66 is in an initial, lowered position corresponding to when the module-forming chamber 38 is in an empty condition, with the module-forming belts defining a generally triangular shape, as viewed from the side. The tensioning arm arrangement 66 normally includes tensioning elements such hydraulic cylinders and/or springs (not shown, but well known) which are mounted between the fixed walls 42 and the arms 68 so as to yieldably resist their upward movement as the module-forming chamber 38 becomes filled with cotton. As shown, one or more of the fixed rolls are driven so as to cause the belts 50 to be driven, with the drive direction being such as to cause the incoming cotton to travel counterclockwise as it is added as a spiral layer to the growing cotton module.

A module or bale wrapping system 80 is mounted to a rear wall of the discharge gate 46 and includes a cover 82 hinged at its top and covering an active wrapping material supply roll 84 consisting of wrapping material 86. The wrapping material 86 used here is preferably, but not necessarily, formed from semi-permeable plastic sheet. An end section of wrapping material 86 extends downwardly from a forward side of the supply roll 84 and is fed between upper and lower wrap material feed rolls 88 and 90, respectively, with the upper roll 88 being engaged with, and located slightly behind, the lower roll 90 so that a common tangent to the rolls, at their line of contact, extends upwardly and forwardly toward a vertical run of the module-forming belts 50. At the beginning of a wrapping cycle, a belt drive (not shown) including belt pulleys coupled to respective ends of the lower rear gate roll and the upper feed roll 88 is established and the length of wrapping material is delivered against the vertical run of the belts 50 and carried to a wrapping material guide structure 92 which extends beneath a lower run of the belts 50, the belts 50 acting to carry the wrapping material along the guide structure 92, and then around the lower front gate roll 64 and into the module-forming chamber 38, by way of the chamber inlet 40, the length of wrapping material 86 then being trapped between the module-forming belts 50 and a completed cotton module 94. The speed at which the wrapping material 86 is moved by the belts 50 and rotating module 94 is greater than the speed at which it is delivered by the feed rolls 88 and 90, causing the wrapping material 86 to be tensioned and stretched as it is wrapped about the module 94. Once a desired length of the wrapping material (1.5 to 2 wraps, for example) is wrapped about the cotton module 94, the drive to the feed roll 88 is discontinued and a cutting mechanism, which may be in the form of a knife and anvil arrangement, for example, (not shown) located just downstream of the feed rolls 88 and 90 is actuated so as to sever the wrapped material 86 from the unwrapped material remaining on the supply roll 84. A knife-operation sensor (not shown) is used for providing a signal to a computer (not shown) located in the cab of the harvester 10 for initiating operation of a pair of hydraulic gate cylinders (not shown), which are coupled between the fixed side walls 42 and the gate side walls 44, as is well known, for causing the discharge gate 46 to be pivoted to its raised discharge position for permitting a wrapped module 94 to roll onto a cradle-shaped framework 96 of a module discharge arrangement 100.

The framework 96 of the module discharge arrangement 100 is pivotally mounted, as at 102, to a rear end region of the main frame 12 for swinging vertically between a raised, module-receiving position, as shown, and a lowered, module-depositing position for permitting the module 94 to roll off the framework 96 onto the ground. The framework 96 is moved between its raised and lowered positions by a pair of hydraulic actuators 104 mounted between the frame 12 and the framework 96. The module discharge arrangement 100 may be operated such that two cotton modules 94 are deposited on the ground close to each other for subsequent handling by leaving a first wrapped module 94 on the framework 96 during formation and wrapping of a second module 94, with the first module 94 being deposited on the ground shortly before the framework 96 is positioned for receiving and then depositing the second wrapped module 94. For the purpose of generating data for cotton yield mapping, a cotton module weight measuring device (not shown) may be associated with the module discharge arrangement 100 so as to produce a weight signal when a cotton module is resting on the cradle defined by the framework 96, with the location of a given module being determined by a global positioning system including a signal transmitter (not shown) carried by the harvester 10.

Figure 2:
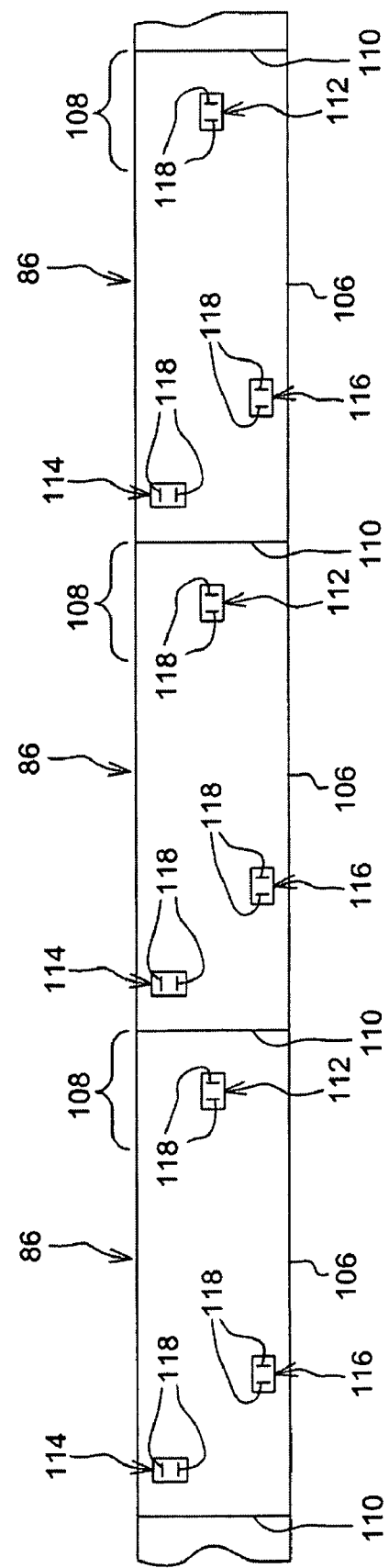
FIG. 2 is a schematic top view of a length of plastic wrapping material to which RFID tags have been attached.

In order to aid in the handling and identification of the modules 94 subsequent to their being deposited on the ground, the wrapping material 86 is preferably manufactured to include a plurality of radio frequency identification (RFID) tags. Specifically, with reference to FIG. 2 there is shown a length of the wrapping material 86 including three identical segments 106, each having a predetermined length sufficient for providing a desired number of wraps on a module 94 having a predetermined diameter. As considered when wrapped about a module 94, each of the segments 106 includes an inner tail section 108 and an outer tail end 110, with the section 108 and tail end 110 being joined together prior to being separated by the cutting mechanism of the module wrapping system 80. Because of the nature of how the wrapping material 86 enters the module-forming chamber 38 during the wrapping function, the first six feet or so of the inner tail section 108 does not bond well with the next adjoining layer of the wrapping material 86. After approximately six feet of wrapping material becomes engaged with the module, wrap tension and tackiness of one side of the wrapping material 86 helps bond the inner layer of the wrapping material to the second layer.

It is possible that adjacent segments 106 of the wrapping material 86 may be joined together at a lapped joint connected together by an adhesive which permits separation of the joint upon the application of a predetermined tensile force to the lapped joint. U.S. Pat. No. 6,787,209 discloses a plastic wrapping material utilizing such lapped joints. When using such a wrapping material, no cutting mechanism is required to separate the segments 106 one from another. Rather, all that is required is to apply a braking force to the wrapping material supply roll 84 at one side of the lapped joint, with the wrapping action of the module 94 and module-forming belts 50 creating the tensile force necessary for separating the joint. Separation of the joint exposes adhesive on the outer end section of the wrapping material segment 106 adjacent the outer tail end 110 which serves to adhere the outer end section to the underlying layer of wrapping material.

In any event, each of the identical segments 106 of the wrapping material 86 is provided with three RFID tag assemblies 112, 114 and 116, which each include a paper backing into which two RFID tags 118 are incorporated, the purpose of the two tags 118 being to provide a redundancy in the event one of the tags is defective.

The RFID tag assemblies 112, 114 and 116 are strategically placed on each wrapping material segment 106 to allow RFID tag reading capability under various conditions or functions, as is explained below. The tag assembly 112 is fixed to the wrapping material 86 at a location centered within the inner tail section 108. The RFID tag assembly 114 is attached to the wrapping material 86 at a location adjacent one of its lateral sides and spaced trailing relationship to the outer tail end 110, as considered in the direction the wrapping material 86 travels during wrapping operation. The RFID tag assembly 116 is attached to the wrapping material 86 at a location adjacent an opposite side from, and in leading relationship to, the location of the RFID tag assembly 114. The base identification number of each of the six tags of the three tag assemblies 112, 114 and 116 is identical. To differentiate the tag assembly 114 from the tag assemblies 112 and 116, different suffixes are used as part of the numbering scheme, with it being noted that RFID readers can be made to screen for certain suffix locations.

Referring again to FIG. 1, an RFID reader 120 is provided on an upper rear location of the wrapping material guide structure 92, and, during wrapping operation, when the reader 120 identifies the presence of the tag assembly 114, a signal can be sent to the on board computer to cause operation of the cutting mechanism for separating the lead wrapping material segment 106 from the adjacent following segment 106. Another RFID reader 122 is provided at a location adjacent the inlet 40 of the module-forming chamber 38. The reader 122 is positioned such that it will detect the tag assembly 114, regardless of the diameter of the cotton module 94 being formed. The orientation and power level of the RFID reader 122 is such that at least one wrap must be completed during the wrapping process before the reader will identify the tag assembly 114. In the event that the tag assembly 114 is not identified within a certain time after a signal has been sent to initiate the wrapping operation, a warning would be provided to the operator to help prevent the operator from letting the module 94 exit the machine 10 prior to being wrapped. An alternate RFID tag reader 124 is mounted to a support (not shown) extending between an upper region of the fixed side walls 42 located beneath an upper horizontal run of the module-forming belts 50. The tag reader 124 would also be oriented and powered so as to be capable of confirming that tag assembly 114 has made it into the module-forming chamber 38.

By taking advantage of the hexadecimal system used for RFID tag identification, supply rolls 84 of the wrapping material 86 can be configured so that a given portion of a supply roll 84 can be individually identified. One possible use of this information is to give notice to an operator as to how many wrap segments 106 are still left on the supply roll 84 so that the operator knows when a new supply roll 84 of wrapping material 86 must be loaded into the wrapping mechanism 80.

Aside from providing information concerning the location of a given segment 106 of the wrapping material 86 during the wrapping operation, the RFID tags 112, 114, and 116 can be set up to correlate a given wrapped module 94 with other information, including the grower's name, seed variety, field number, module diameter, module weight, module moisture content, average yield where module is produced, and GPS location and associated mapping data.

Figure 3:
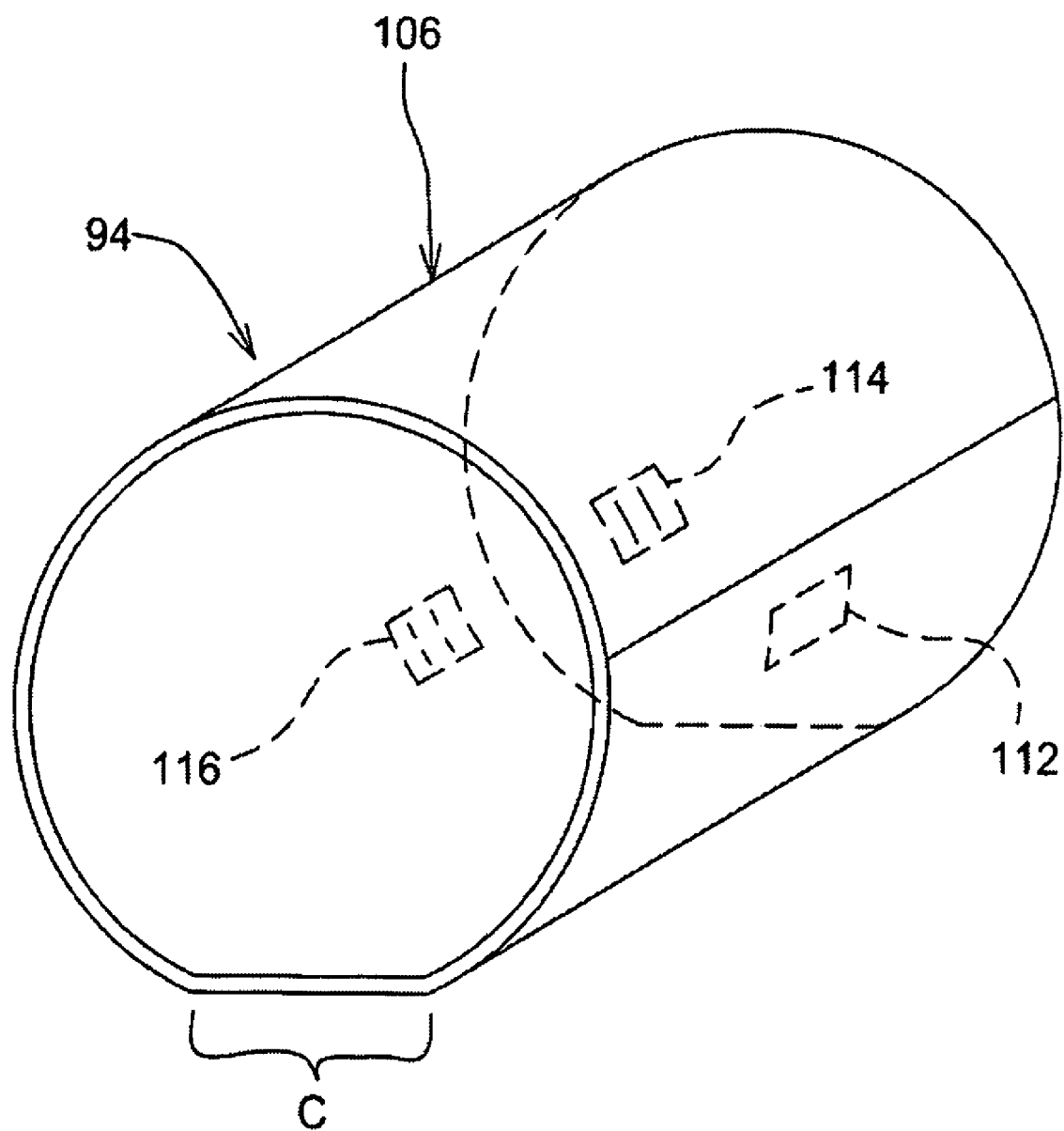
FIG. 3 is a schematic perspective view of a wrapped cotton module showing the location of RFID tag assemblies incorporated into the plastic wrapping material.

Referring now to FIG. 3, there is shown the wrapped cotton module 94 lying on the ground. The wrapping material segment 106 is disposed on the module 94 such that the RFID tag assembly 112 is located against the right-hand side of the cotton module at a location just above the ground line, the RFID tag assembly 114 is located between two adjacent wraps of the wrapping material segment 106 at approximately a 2:00 o'clock location adjacent one end of the module 94, and the tag assembly 116 is between adjacent wraps of the wrapping material at a location approximately diametrically opposite from, and adjacent the opposite end of the module 94 from, the tag assembly 114. It can be seen that the module 94 becomes deformed from its cylindrical shape when resting on the ground so as to have a relatively long contact zone C. Because of this, it is possible that the RFID tag assemblies 112 and 114 can both be in ground contact after the module 94 is deposited on the ground by the harvester 10. The position of the RFID tag assembly 116 relative to the tag assemblies 112 and 114 is selected so that it is ensured that at least one of the tag assemblies 112, 114 and 116 is out of ground contact so as to permit it to be read with a hand-held or machine carried tag reader.

Figure 4:
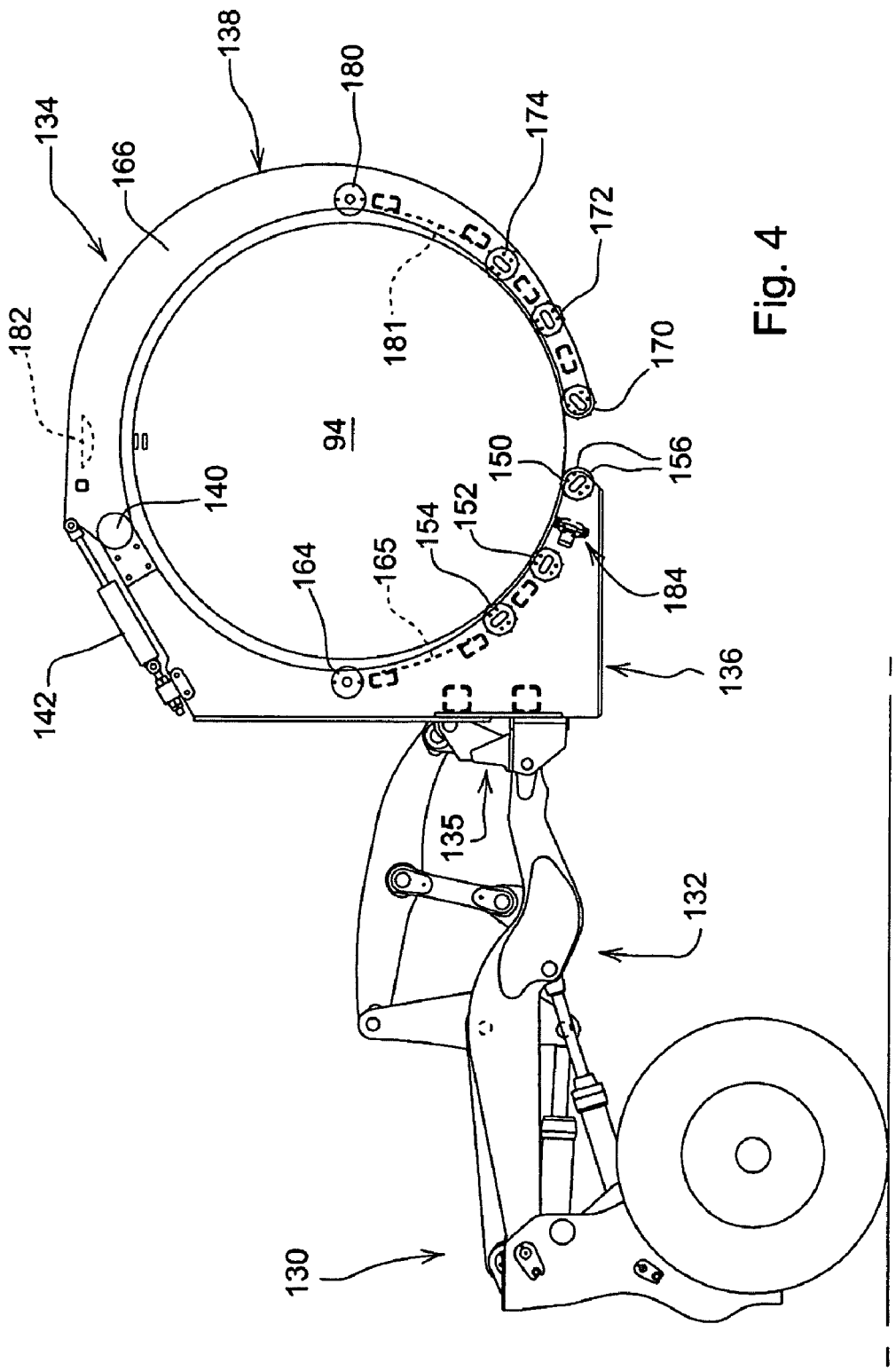
FIG. 4 is a right side view of a forward section of a front end loader supporting a grapple attachment specially designed for handling cylindrical cotton modules wrapped in plastic wrapping material.

Once the wrapped modules 94 are deposited onto the ground, it is desired to stage four or more of the modules 94 generally end-to-end in the field for being subsequently loaded onto a flat bed truck or trailer for being hauled to a cotton gin. One module handler for achieving such staging is illustrated in FIG. 4 where there is shown a forward section of an articulated, front end loader 130 having a loader arm assembly 132 to which a grapple attachment 134 is coupled by a connection arrangement 135 provided at a rear side of the grapple attachment. It is to be noted that, instead of being mounted to a loader, the grapple attachment 134 could just as well be attached to a tractor equipped with a three-point hitch by providing the attachment 134 with an appropriate attaching plate.

Figure 5:
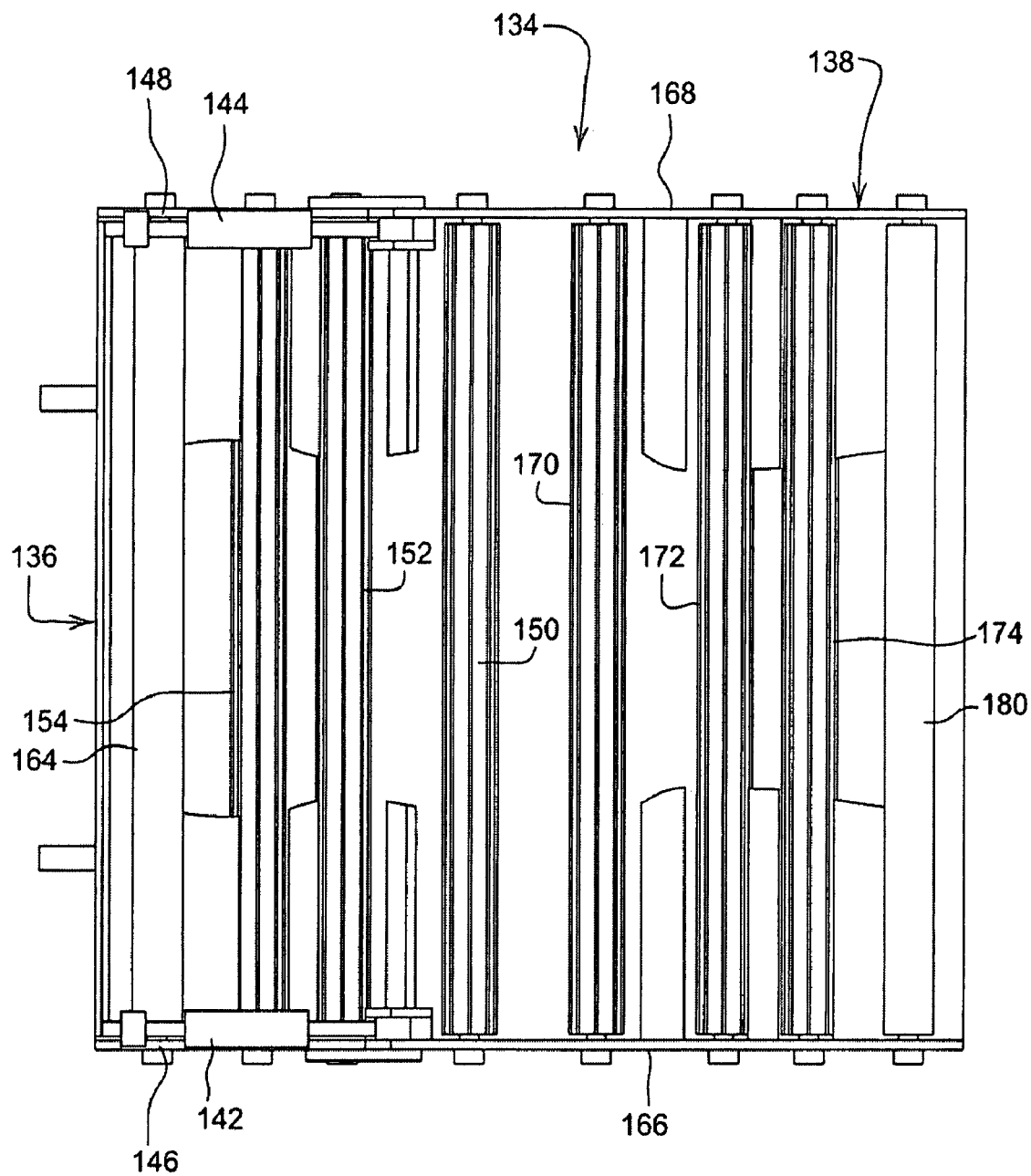
FIG. 5 is a top view of the grapple attachment shown in FIG. 4.

Referring also to FIG. 5, it can be seen that the grapple attachment 134 includes a forwardly curved (C-shaped), fixed grapple section 136, to an upper forward end of which an upper rearward end of a rearwardly curved (reverse C-shaped) movable grapple section 138 is pivotally coupled, as at a pivot assembly 140 for swinging vertically between a lowered closed position, as shown, and a raised open position. A pair of extensible and retractable hydraulic grapple cylinders 142 and 144 are coupled between the fixed and movable grapple sections 136 and 138, respectively, for selectively pivoting the movable grapple section 138 between its open and closed positions.

The fixed grapple section 136 includes a pair of transversely spaced side plates 146 and 148. Extending between, and having opposite ends rotatably mounted in, the side plates 146 and 148 are identical first, second and third powered rollers 150, 152 and 154, respectively, which are spaced one from another and are located in a lower front region of the fixed grapple section 136, with the first roller 150 being forward of the other two rollers. Provided at equally spaced locations about a circumference of each of the powered rollers 150, 152 and 154 are a plurality of longitudinally extending rods 156 having a purpose explained below. First, second and third, reversible hydraulic motors 158, 160 and 162 (shown only in FIG. 9) are respectively coupled for driving the powered rollers 150, 152 and 154. A first idler roller 164 extends between, and has opposite ends rotatably mounted in, the side plates 146 and 148 at approximately a nine o'clock position, as viewed in FIG. 5. A filler plate 165, which may be constructed of expanded metal, extends transversely between, and has opposite ends fixed to the side plates 146 and 148 at respective regions located between the powered roller 154 and the idler roller 164.

The movable grapple section 138 includes a pair of transversely spaced side plates 166 and 168. Extending between, and having opposite ends rotatably mounted in, the side plates 166 and 168 are identical fourth, fifth and sixth powered rollers 170, 172 and 174, respectively, which are spaced one from another along a lower rear region of the grapple section 138, with the roller 170 being rearward of the roller 172. Fourth, fifth and sixth reversible hydraulic motors 175, 176 and 178, respectively, are coupled to the powered rollers 170, 172 and 174. A second idler roller 180 extends between, and has opposite ends rotatably mounted in the side plates 166 and 168 at approximately a three o'clock position, as viewed in FIG. 5. A plate 181, similar to the plate 165, is fixed to the side plates 166 and 168 in the region between the powered roller 174 and idler roller 180.

As viewed in FIG. 4, it can be seen that the various powered rollers and the idler rollers are positioned so that a portion of their respective peripheries extend beyond inner edges of the side plates 146, 148, 166 and 168, so as to be in engagement with a given wrapped cotton module 94, which is encompassed by the fixed and movable grapple sections 136 and 138, respectively, so as to support the module 94 for movement free of the side plates. An RFID reader 182 is supported at an upper location between the side plates 166 and 168 so as to be positioned for sensing the attached RFID tag assembly 112 when the latter is positioned at the top of the module 94, thus indicating the presence of the loose inner tail section 108 at the top of the bale, this being the desired position of the tail section for the removal of the module wrapping when removal is to be done by cutting a slit across a width of the wrapping at a bottom location of the module. In the event the RFID reader 182 does not read the RFID tag assembly 112, then the sets of powered rollers 150, 152, 154 and 170, 172, 174 are appropriately driven to cause the module 94 to rotate until the reader 182 does sense the RFID tag assembly 112.

The wrapped module 94 is ready to be maneuvered into position over the conveying floor 290 (see FIG. 13) of a cotton gin once the RFID reader 182 indicates that the RFID tag assembly 112 is located at the top of the module 94 so as to permit the bottom surface of the wrapping to be slit lengthwise of the module, thereby permitting the cotton to flow through the slit.

Figure 6:
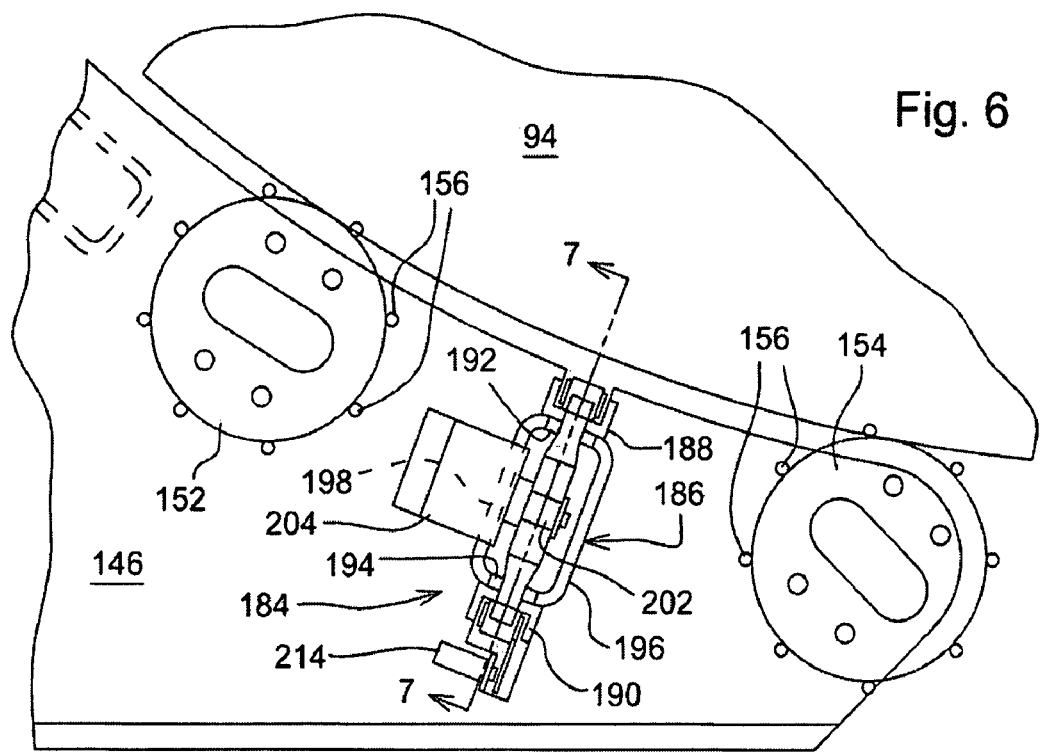
FIG. 6 is a an enlarged view of a lower front region of the fixed, rear section of the grapple attachment shown in FIG. 5.
Figure 7:
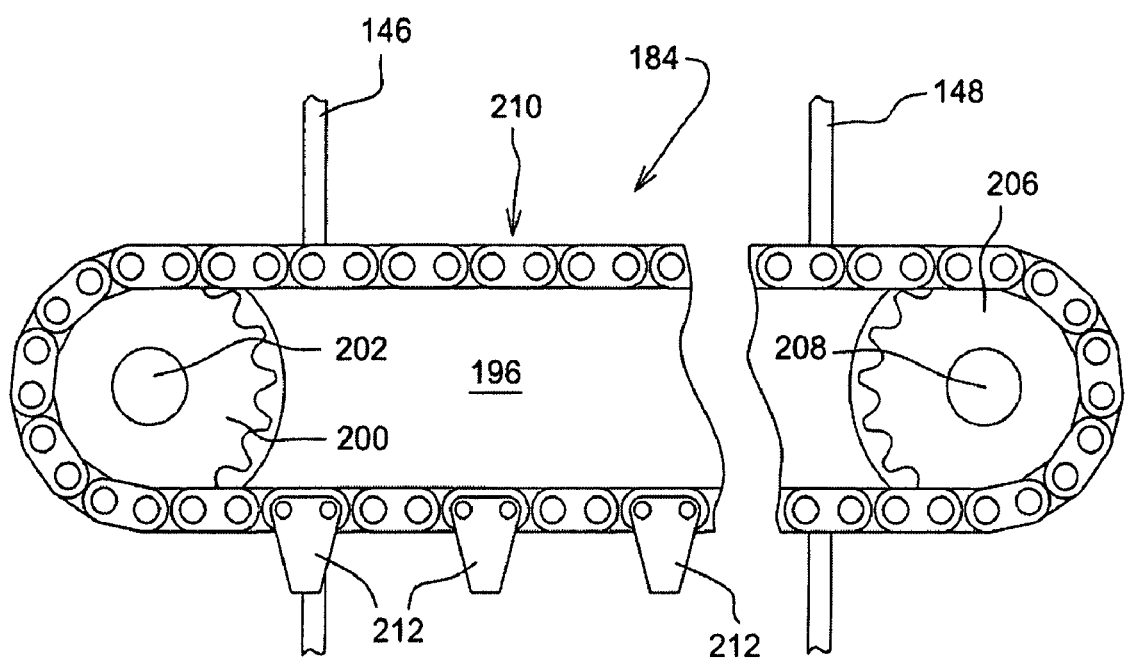
FIG. 7 is a sectional view taken along the line 7-7 of FIG. 6 showing the wrapping material cutting device.

Referring now to FIGS. 6 and 7, there is shown a wrapping cutter mechanism 184, which is provided for the purpose of slitting the wrapping of the wrapped module 94. The wrapping cutter mechanism 184 is located between, and extends parallel to, the first and second powered rollers 150 and 152. The cutter mechanism 184 is in the form of a chain cutter and includes a support member 186 defined by a tube, of rectangular cross section, having a length greater than the distance between the side plates 166 and 168, with the support member 186 extending through, and being secured at openings provided in the side plates. Upper and lower chain guides 188 and 190 are each defined by channel members which extend lengthwise of, and have their respective webs joined to top and bottom sides 192 and 194, respectively, of the support member 186. As viewed in FIG. 6, a right side 196, the top side 192 and the bottom side 194 of the support member 186 have opposite end regions cut away, while a left side 198 extends the full length of the support member 186. Referring also to FIG. 7, it can be seen that a drive sprocket 200 is mounted to a drive shaft 202 of a low speed, high torque, reversible hydraulic motor 204 having its housing bolted to the left side 198 of the support member 186. Another sprocket 206 is mounted to a shaft 208 mounted to the left side 198 of the support member 186 at a location on an opposite end of the left side 198 from that to which the hydraulic motor 204 is mounted. An endless cutter chain 210 is trained about the sprockets 200 and 206, and mounted to connecting pins at a lower run of the chain 210 are a plurality of replaceable cutter blades 212, with it being noted that the cutter blades 212 will extend above the side plates 166 and 168 only upon the hydraulic motor 204 being operated to cause the lower run of the chain, as viewed in FIG. 7 to become the upper run. Supported from the side plate 166 is a proximity sensor 214 positioned for sensing the presence of the cutter blades 212 so that the blades may be parked out of the way when a module 94 is being handled by the grapple attachment 134. One of the motor 204 or shaft 208 is mounted for adjustment toward and away from the other, in a well known manner, not shown, so as to permit removal of the cutter chain 210 without requiring the disconnection of a master link, or the like.

Figure 8:
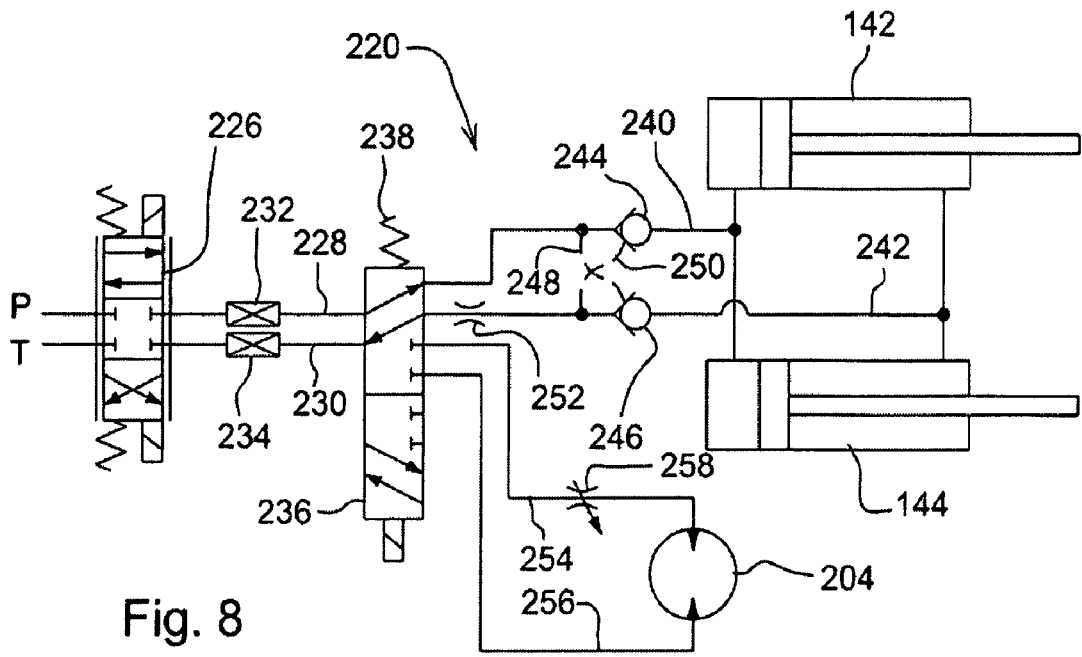
FIG. 8 is a schematic view of the hydraulic circuit for controlling the grapple cylinders and module wrap chain cutter.

Referring now to FIG. 8, there is shown a schematic representation of a hydraulic control circuit 220 for controlling operation of the pair of grapple cylinders 142 and 144, and for controlling operation of the chain cutter motor 204. Specifically, a source of fluid pressure P, which may be a pump, and a tank or reservoir T are shown connected to a solenoid-operated, three-position, four-way servo control valve 226. These components are normally carried by the tractor. A set of pressure/return lines 228 and 230 are also connected to the servo control valve 226, with the connection being by quick couplers 232 and 234, respectively. The pressure/return lines 228 and 230 are coupled to a solenoid-operated, two-position grapple/cutter mode selector valve 236. The mode selector valve 236 is normally biased to a grapple mode by a spring 238, wherein it couples the pressure/return lines 228 and 230 respectively to the head and rod ends of the grapple cylinders 142 and 144, by way of respective coupling lines 240 and 242. At the same time the mode selector valve 236 acts to block fluid flow to and from the chain cutter motor 204. The line 240 contains a check valve 244 preventing return flow from the grapple cylinders to the mode selector valve 236, while the line 242 similarly contains a check valve 246 preventing return flow from the grapple cylinders to the mode sector valve 236. Pilot pressure lines 248 and 250 are respectively connected between the seat for the check valve 244 and a location upstream of the check valve 246, and between the seat for the check valve 246 and a location upstream of the check valve 244. A restrictor 252 is located between the check valve 246 and the mode selector valve 236, the restrictor 252 acting to regulate the speed of operation of the grapple cylinders 142 and 144.

When the servo control valve 226 is shifted downwardly from its normal neutral position, shown in FIG. 8, pressure fluid will flow through the pressure/return line 228 and through the mode selector valve 236 and past the check valve 244 and to the head ends of the grapple cylinders 142 and 144. Pressure upstream of the check valve 244 will flow through the pilot pressure line 248 and unseat the check valve 246 so as to permit fluid to return from the rod ends of the grapple cylinders, thus permitting the grapple cylinders to extend. Retraction of the grapple cylinders 142 and 144 is similarly effected by shifting the servo control valve 226 upwardly from its illustrated neutral position.

Operation of the chain cutter hydraulic motor 204 is effected by actuating the grapple/cutter mode selector valve 236 so that it shifts upwardly, as viewed in FIG. 8. This results in the pressure/return lines 228 and 230 being respectively coupled to opposite work ports of the hydraulic motor 204 via pressure/return lines 254 and 256, with the line 254 containing a variable restrictor 258 for controlling the speed of the motor 204. At the same time, the mode selector valve 236 blocks the flow of fluid to and from the hydraulic grapple cylinders 142 and 144. Rotation of the motor 204 in a first direction is effected by actuating the servo control valve 226 so that it shifts downwardly from its neutral position, and rotation of the motor 204 in an opposite second direction is effected by shifting the servo control valve 226 upwardly from its illustrated neutral position.

Figure 9:
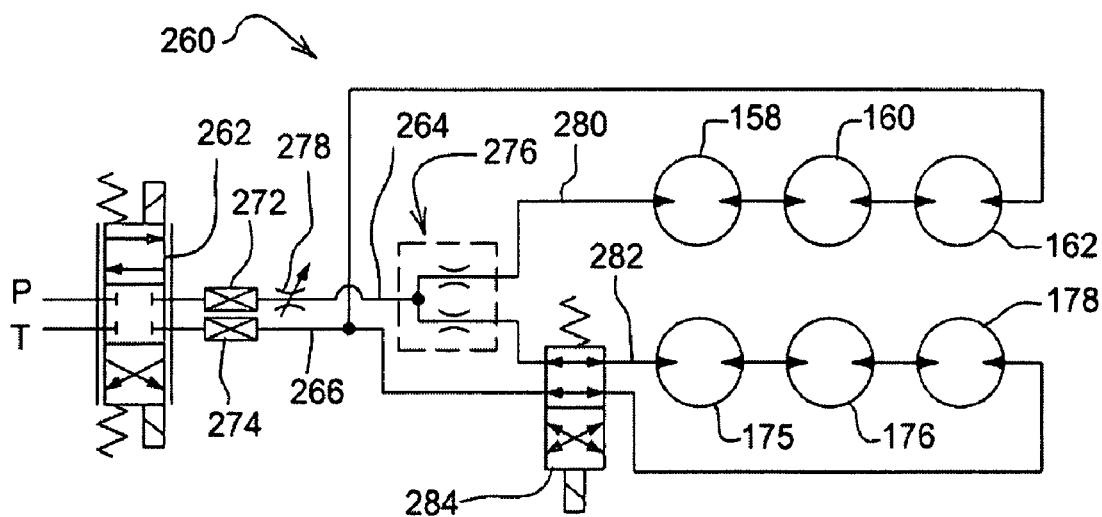
FIG. 9 is a schematic view of the hydraulic circuit for operating the roller motors.

Referring now to FIG. 9, there is shown a schematic representation of a hydraulic circuit 260 for controlling the operation of the set of reversible hydraulic roller drive motors 158, 160 and 162 carried by the fixed grapple section 136, and for controlling operation of the set of reversible hydraulic roller drive motors 175, 176 and 178 carried by the movable grapple section 138. The hydraulic circuit 260 includes a second solenoid-operated, three-position, four-way servo control valve 262 coupled on the one hand to the source of fluid pressure P and the tank T, and on the other hand to pressure/return lines 264 and 266, by way of quick couplers 272 and 274. The pressure/return line 264 is connected to a flow divider 276 and contains a variable restrictor 278 located upstream from the flow divider, for the purpose of controlling the speed of the hydraulic roller drive motors, as will be apparent. The flow divider 276 has first and second outlets respectively coupled to first and second branch lines 280 and 282. The first branch line 280 forms a loop which contains the set of series-connected hydraulic drive motors 158, 160 and 162 and has an end coupled to the pressure/return line 266 at a location between the servo control valve 262 and a solenoid-operated, two-position roller mode selector valve 284. The second branch line 282 contains the mode selector valve 284 and from there forms a loop which contains the set of series-connected hydraulic drive motors 175, 176 and 178, and has an end coupled back to an opposite side of the mode selector valve 284 from its connection with the pressure/return line 266.

The roller mode selector valve 284 is normally located in a module engaging/releasing/ginning mode, as shown, wherein, depending on the position of the servo control valve 262, the branch line 280 conveys fluid for driving the set of motors 158, 160 and 162 in first or second directions while the second branch line 282 simultaneously conveys pressure fluid to the set of motors 175, 176 and 178 so as to drive them respectively in a direction opposite to direction in which the set of motors 158, 160 and 162 are being driven. Upon actuation, the mode selector valve 284 shifts upwardly to a cotton module rotation mode wherein in the branch line routes fluid to and from the set of motors 175, 176 and 178 for causing them to be driven in the same direction in which the set of motors 158, 160 and 162 are being driven, which, when a module 94 is supported by the sets of powered rollers 150, 152, 154, and 170, 172, 174 results in the module being rotated.

Figure 10:
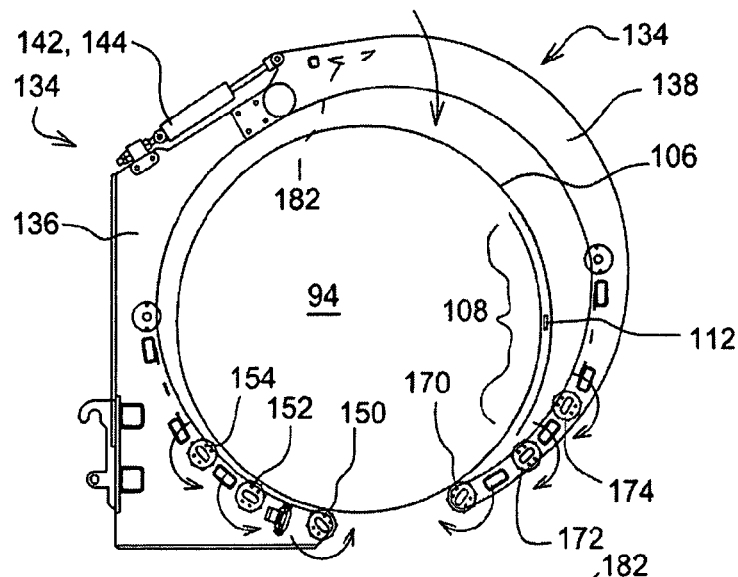
FIG. 10 is a schematic view illustrating the direction of rotation of the grapple rolls during bringing the grapple attachment into engagement with a module lying on the ground.

Specifically, referring now to FIG. 10, the grapple attachment 134 is schematically depicted during an operation for engaging a wrapped cotton module 94 resting on the ground in a field or on a trailer or truck bed at a cotton gin. Initially, the movable grapple section 138 is placed in its raised position by actuating the grapple cylinders 142 and 144 so that they retract, this operation being accomplished by actuating the servo control valve 226 so that it shifts upwardly from its neutral position shown in FIG. 8. Next, the first set of hydraulic motors 158, 160 and 162, which are carried by the fixed grapple section 136, are caused to be driven counter clockwise to aid movement of the rollers 150, 152 and 154 beneath, and into supporting relationship to the module 94 as the fixed grapple section 136 is moved against a left side region of the module 94. At the same time, the second set of hydraulic motors 175, 176 and 178, which are carried by the movable grapple section 138, are driven clockwise while the grapple section 138 is moved from its raised to a lowered position. This direction of rotation of the set of rollers 170, 172, and 174 together with the powering of the set of rollers 150, 152 and 154 resulting in the rollers being brought underneath the module 94. The combination of closing the movable grapple section 136 and powering the various rollers provides a means for lifting the module 94 while producing minimal damage to the wrapping. Also, no rotation of the module 94 takes place since the opposite directions of rotation of the two sets of rollers imposes cancelling drive forces on the module 94.

Figure 11:
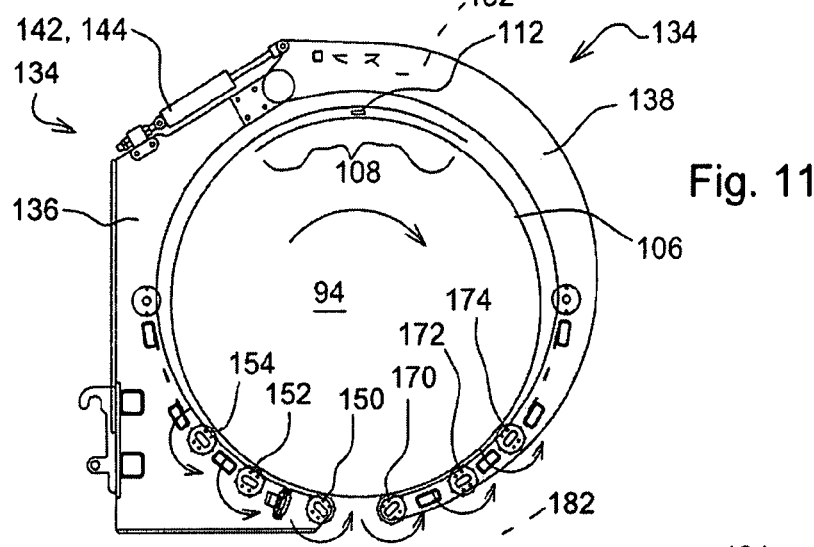
FIG. 11 is a view like FIG. 10, but illustrating the direction of rotation of the grapple rolls for rotating the module for placing the inner tail section of the wrapping material at a 12:00 o'clock position prior to the removal of the wrapper at the cotton gin.

Referring now to FIG. 11, the grapple attachment 134 is schematically depicted during an operation for rotating the wrapped cotton module 94 for correctly positioning the loose inner tail section 108 of the wrapping material segment 106 for bringing the RFID tag assembly 112, including redundant tags 118 (see FIG. 2) into register with the RFID tag reader 182. This operation is accomplished by actuating both the servo control valve 262 and the roller mode selector valve 284, so that they shift upwardly from their respective neutral position and normal position shown in FIG. 9, thereby causing all of the roller drive motors 158, 160, 162, 175, 176 and 178, and the respective associated rollers 150, 152, 164, 170, 172 and 174 to rotate counter clockwise, which, in turn, causes the cotton module 94 to rotate clockwise. When the RFID tag assembly 112 passes beneath the RFID reader 182, a signal is generated which is transmitted to operator who stops operation of the motors by deactivating the servo control valve 262 so that it returns to its neutral position. The inner tail section 108 of the wrapper is then positioned at the top of the module 94, which is the appropriate position for having the wrapping opened by manually or mechanically slitting the wrapping at a location substantially diametrically opposite from the location of the RFID tag assembly 112.

Figure 12:
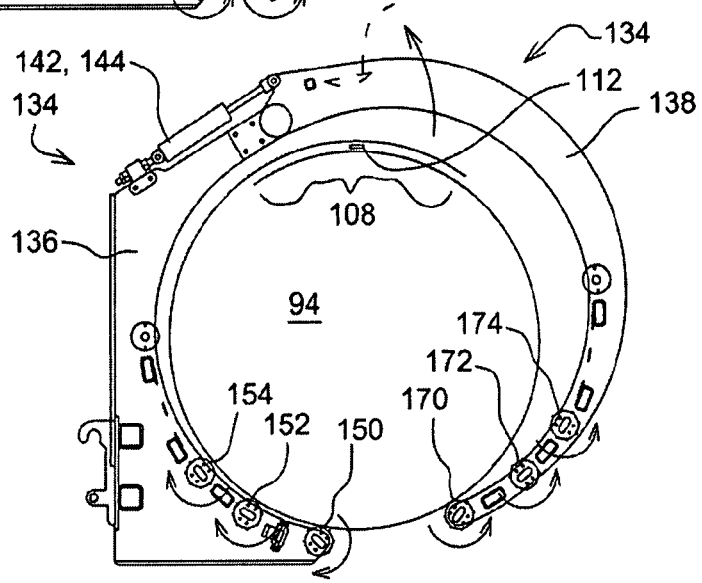
FIG. 12 is a schematic view showing the module of FIG. 11 being released onto a gin feeder floor and showing the direction of rotation of the grapple rollers for powering out from underneath the module while letting the natural expansion of the module cause the wrap to pull out from underneath.

Referring now to FIG. 12, the grapple attachment 134 is schematically depicted during an operation for removing the wrapping material for releasing the encased cotton so that the cotton falls upon a cotton gin conveyor floor 290 (see FIG. 13) over which the grapple attachment 134 has been positioned by operation of the front end loader 130. The removal of the wrapping material is accomplished by actuating the solenoid of the grapple/cutter mode selector valve 236 so that it shifts upwardly from its normal grapple mode to its cutter mode, as viewed in FIG. 8. This results in the pressure/return lines 228 and 230 being respectively coupled to opposite work ports of the hydraulic motor 204 via the feed lines 254 and 256, with the feed line 254 containing the variable restrictor 258 for controlling the speed of the motor 204. Rotation of the motor 204 results in the endless cutter chain 210 being driven by the sprocket 214 such that the cutter blades 212 move about the sprocket 200 and into contact with the wrapping material so as to slit the wrapping material lengthwise of the module 94. Once the leading cutter blade 212 returns to its starting position, as determined by the proximity sensor 214, current to the servo control valve 226 and to the grapple/cutter mode selector valve 236 will be automatically interrupted in response to a signal from the proximity sensor 214, with the result that the servo control valve 226 will return to its neutral position blocking the flow of fluid to and from the chain drive motor 204, thus positioning the chain 210 for a subsequent cutting operation. Also, the mode selector valve 236 will return to its normal grapple mode position.

The first set of hydraulic motors 158, 160 and 162 are then operated to drive their associated rollers 150, 152 and 154 in the clockwise direction, while the motors 175, 176 and 178 are driven to drive their associated rollers 170, 172 and 174 in the counter clockwise direction. Simultaneously, the movable grapple section 138 is caused to open by retraction of the grapple cylinders 142 and 144. This results in the sets of rollers 150, 152, 154 and 170, 172, 174 being powered out from underneath the module 94, with the natural expansion of the module 94, once the tensioned wrapping material 86 is slit causing the wrapping ends at the slit to separate during opening of the grapple, permitting the cotton to spill out. The wrapping material 86 is then conveniently located atop the module 94 for manual removal or for mechanical removal by a vacuum device (not shown), such as that disclosed in the aforementioned U.S. Pat. No. 7,165,928, for example.

Figure 13:
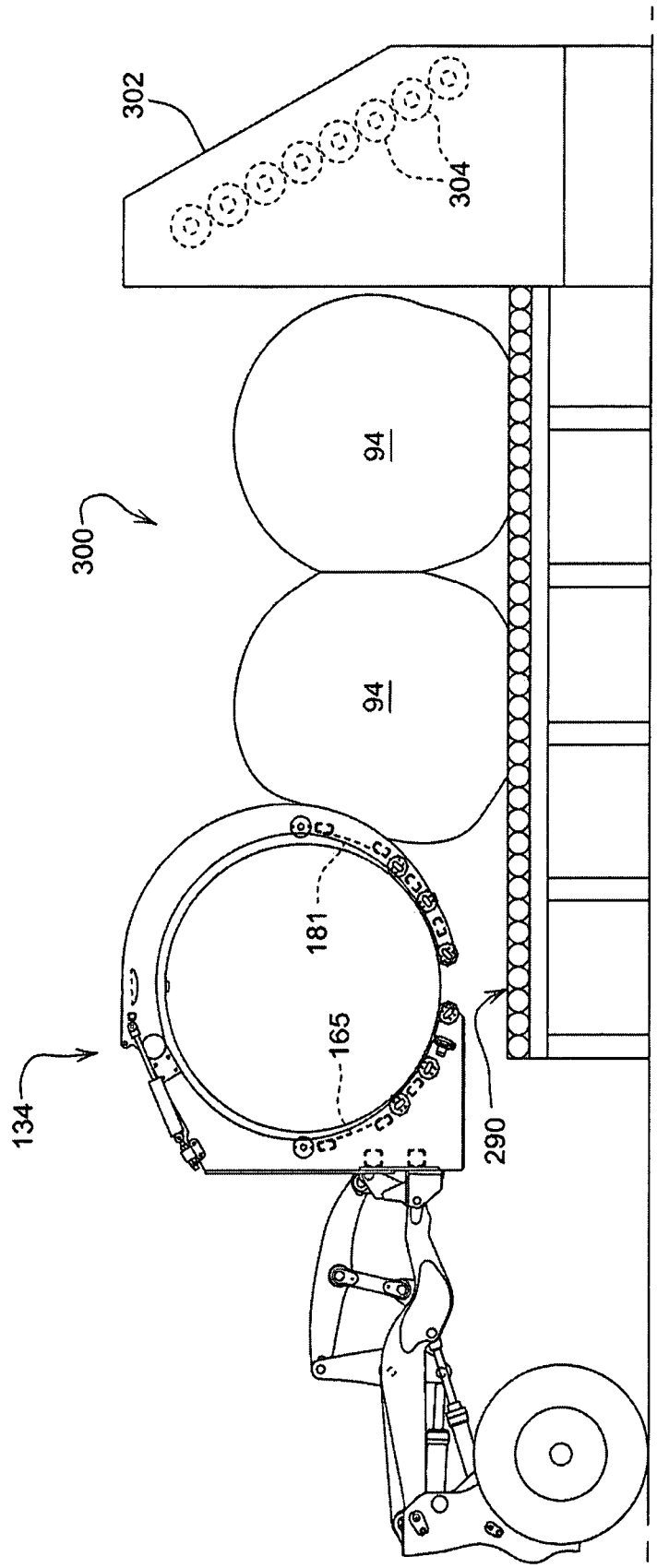
FIG. 13 is a schematic right side view showing the loaded grapple being used as a pusher to close up gaps between unwrapped cotton modules deposited onto roller feeder floor.

Referring now to FIG. 13, there is shown a cotton gin module intake assembly 300 including the roller feeder floor 290 on which a plurality of unwrapped cotton modules 94 have been placed and are operating to feed the unwrapped modules to a disperser head 302 located at an opposite end of the floor 290 and including a set of powered rollers 304 for engaging the modules 94 and dispersing the cotton downwardly into a cotton processing arrangement (not shown). For efficient operation, it is desirable that the feed rate of the cotton to the disperser head 302 be kept substantially constant and this is achieved by using the grapple attachment 134 as a pusher, as shown, to engage the last-placed module 94 and push it tightly against the next adjacent module 94 so as to close up gaps between the modules, with it being noted that this pushing operation may be done while an unwrapped module 94 is contained in the grapple attachment, as shown, or it may be accomplished by using the grapple attachment 134 with the movable grapple section 138 partially opened and engaging the last unwrapped module 94, with the plate 181 preventing cotton from moving through the moveable grapple section 136.

Figure 14:
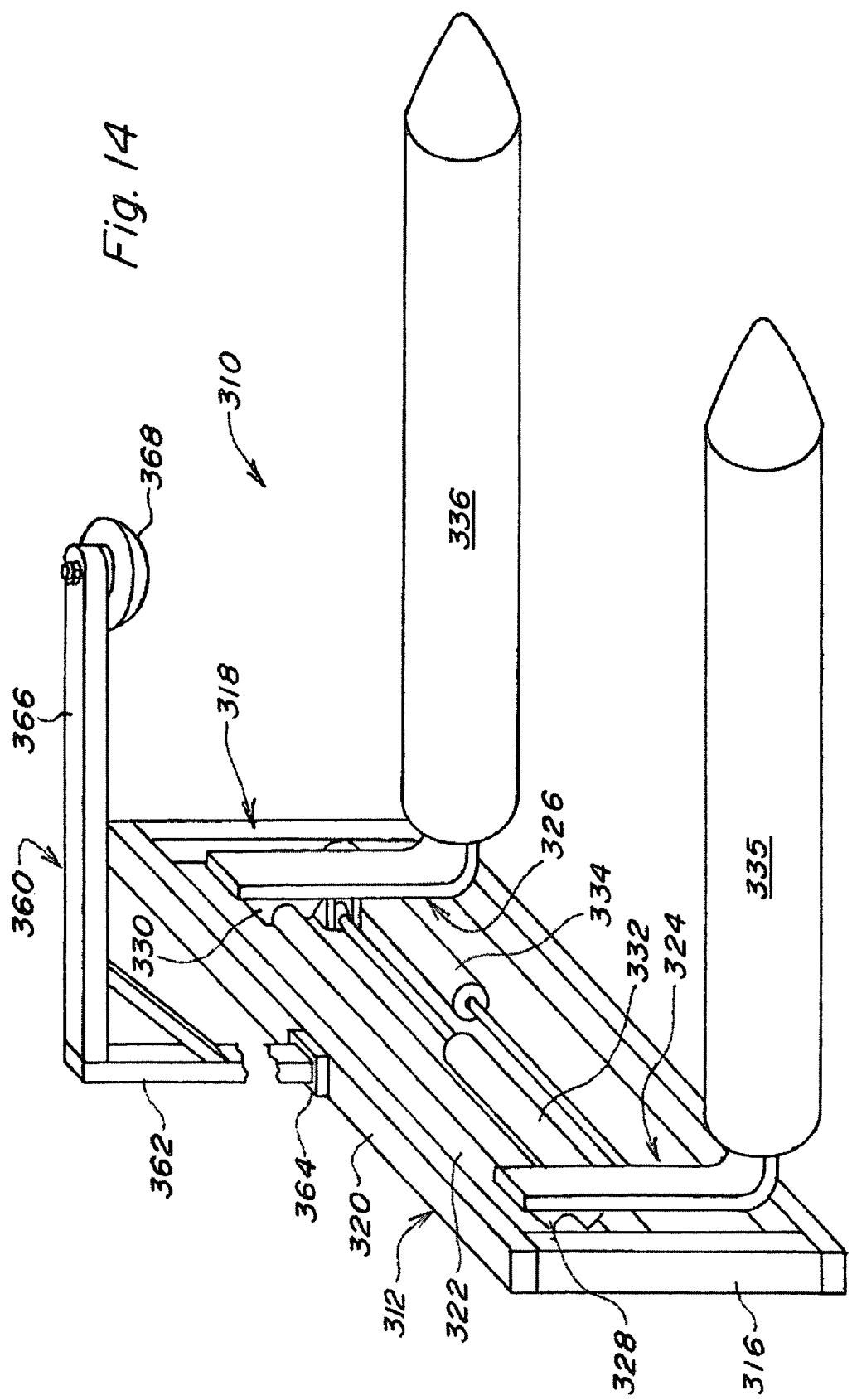
FIG. 14 is a schematic perspective view, with parts removed for clarity, of an alternate module handler in the form of a fork attachment equipped with an RFID reader and a wrapping material gatherer boom, and including a pair of module support tines, formed as driven rollers, which are mounted for being moved transversely relative to each other.
Figure 15:
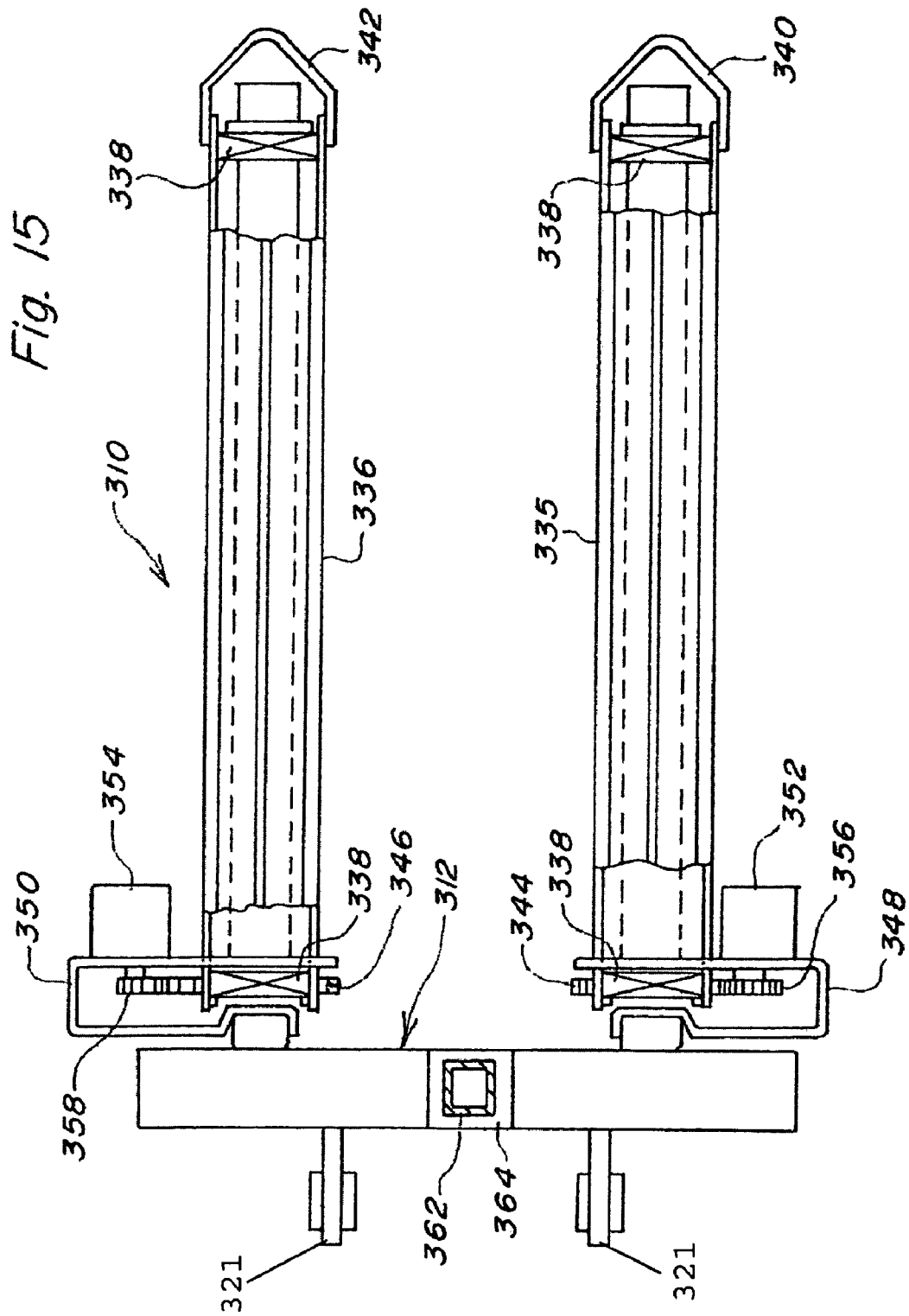
FIG. 15 is a top view of the fork attachment shown in FIG. 13, but omitting the RFID reader support so as to expose the wrap gathering rollers together with the drive arrangement associated with the rollers.

Referring now to FIGS. 14 and 15, there is shown an alternative module handling device in the form of a loader fork attachment 310. The loader fork attachment 310 includes an upright support frame 312 which is generally of a rectangular configuration including a horizontal bottom member 314 to opposite end regions of which are respectively fixed the lower ends of right- and left-hand side members 316 and 318. Upper ends of the side members 316 and 318 are fixed to a horizontal top member 320. Fixed to a back side of the support frame 312 is a connection arrangement 321 (FIG. 15) adapted for connection to arms of a loader. A horizontal cylindrical guide rod 322 extends transversely between, and has opposite ends fixed to the side members 316 and 318. Right- and left-hand elongate fork members 324 and 326, respectively, are of a conventional configuration having respective upright rear sections respectively provided at upper, rear regions with eyes 328 and 330 that are respectively received for sliding along the guide rod 322. A first extensible and retractable hydraulic cylinder 332 has its cylinder end fixed to the right-hand side member 316 and its rod end coupled to the left-hand fork member 326. Similarly, a second extensible and retractable hydraulic cylinder 334 has its cylinder end fixed to the left-hand side member 318 and its rod end coupled to the right-hand fork member 328. Thus, it will be appreciated that the hydraulic cylinders 332 and 334 serve to effect lateral movement of the fork members 324 and 326 relative to each other so as to accommodate cotton modules 94 of different diameters, as is more fully described below.

As shown, first and second module support rollers 335 and 336, of cylindrical tubular construction, are respectively rotatably mounted on respective horizontal sections of the fork members 324 and 326 by a pair of bearing assemblies 338 (shown only in FIG. 15) located one each at opposite inner end regions of each of the tubes and being fixed to opposite end regions of the horizontal fork sections. Conical caps 340 and 342 are respectively provided for closing the front ends of each of the cylindrical module support rollers 335 and 336 and may be secured in any known fashion (not shown), but preferably by a quick-attach design such as a snap fit, for example.

A drive arrangement (shown only in FIG. 15 for the purpose of clarity) is provided for effecting selective rotation of the module support rollers 335 and 336 and includes respective driven gears 344 and 346 respectively fixed about the tubes 335 and 336 at end regions opposite from those engaged by the conical caps 340 and 342. Motor mounting brackets 348 and 350 are respectively fixed to, and project outwardly from, respective regions of the fork members 324 and 326 where the upright fork sections join the horizontal fork sections. Respectively mounted to the brackets 348 and 350 are identical low speed, high torque hydraulic motors 352 and 354, with the motor 352 having an output shaft carrying a drive gear 356 meshed with the gear 344 carried by the roller 335, and with the motor 354 having an output shaft carrying a drive gear 358 meshed with the gear 346 carried by the roller 336.

An RFID reader support structure 360 (shown only in FIG. 14, for the sake of clarity) includes a vertical post 362 having its lower end joined to a horizontal mounting plate 364 that is joined to the top of the frame top member 320 at a location midway between opposite ends of the top member 320. Joined to, and supported in cantilever fashion from a top region of the post 362 is a horizontal support member 366 which extends forwardly a distance approximately equal to one half the length of the rollers 335 and 336. An RFID reader 368 is vertically adjustably mounted to a forward end region of the horizontal support member 366 so as to be in position for reading an RFID tag embodied in the wrapping material encompassing a given cotton module 94 supported on the rollers 335 and 336.

Figure 16:
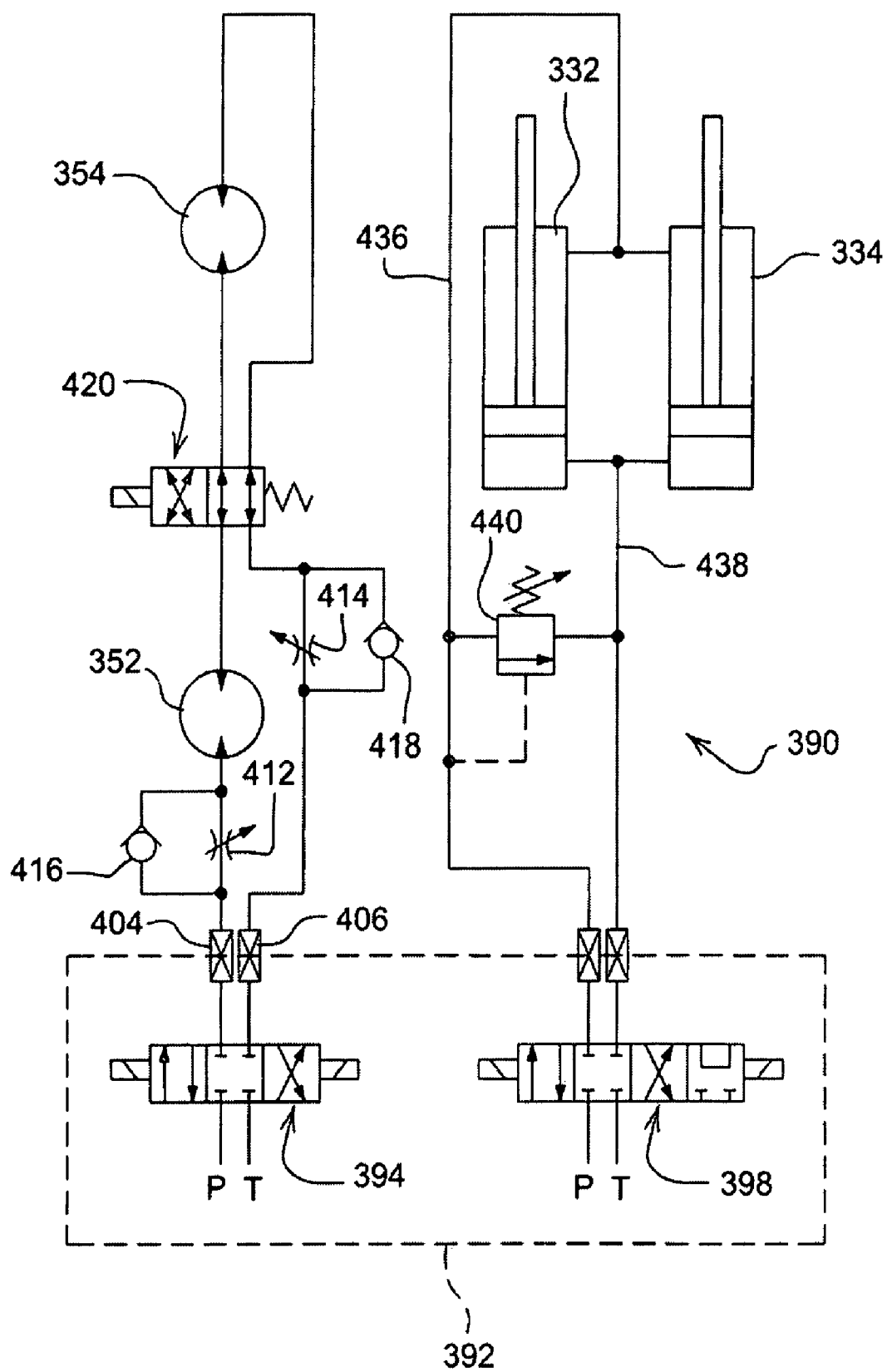
FIG. 16 is a schematic view of the hydraulic circuit for operating the powered rollers and the cylinders for adjusting the distance between the powered rollers.

Referring now to FIG. 16, there is schematically shown a hydraulic circuit 390 for controlling the various hydraulic functions associated with the loader fork attachment 310. Specifically, the vehicle (loader or tractor, for example) supporting the loader fork attachment 310 includes a hydraulic system indicated by the functional box 392 in which is embodied a three position, solenoid-operated servo control valve 394 and a four-position, solenoid-operated servo control valve 398. Each of the servo control valves 394 and 398 has pressure and return ports respectively coupled to a source of fluid pressure P and a tank or reservoir T.

The servo control valve 394 is used for controlling the reversible module support roller drive motors 352 and 354, and coupled to the servo control valve 394 by respective quick-couplers 404 and 406 are pressure/return lines 408 and 410. Located in series in the pressure/return line 408 are the motors 352 and 354, with an adjustable orifice 412 being located in series between the quick-coupler 404 and the motor 352. A similar adjustable orifice 414 is coupled in the pressure/return line 410 at a location between the quick-coupler 406 and the motor 354. Thus, the adjustable orifices 412 and 414 are respectively positioned so as to control the speeds of the motors 352 and 354 in both directions of their operation. Respective check valves 416 and 418 are coupled to bypass return flow from the motors 352 and 354 respectively around the orifices 412 and 414. Provided for selectively controlling the motor 354 for causing it to be driven in an opposite direction from the motor 352 is a solenoid-operated, two-position direction selector valve 420 coupled to the pressure/return line 408 at a location between the motors 352 and 354, and coupled to the pressure/return line 410 at a location between the motor 354 and the orifice 414. The direction selector valve 420 is shown biased to a normal position wherein it connects the motor 354 for being driven in the same direction as the motor 352, with return flow from the motor 354 passing through the check valve 418. Actuation of the solenoid of valve 420 results in the valve 420 shifting to the right, from the normal position illustrated, so as to cause the motor 354 to be driven in a direction opposite to that of motor 352, with return flow from the motor 354 again flowing through the check valve 418.

The servo control valve 398 is used for controlling the operation of the fork adjustment cylinders 332 and 334, and is connected to a first pressure/return line 436 coupled to the rod ends of the fork adjustment cylinders 332 and 334, while a second pressure/return line 438 is coupled to a cylinder end of each of the cylinders. An adjustable pressure relief valve 440 is coupled between the pressure/return lines 436 and 438.

Referring now to FIGS. 17, 18 and 19, there is shown a series of schematic depictions of the operation of the fork attachment 310, which might take place at a cotton gin, for example, when lifting the wrapped cotton module 94 from a transport trailer or truck, positioning the wrapped module for having the wrapping slit at a bottom location and then for removing the slit wrapping.

Prior to the rollers 335 and 336 being shifted inwardly toward each other, as indicated by inwardly directed, straight arrows in FIG. 17, the hydraulic cylinders 332 and 334 are extended so that the rollers are separated from each other a distance permitting the rollers 335 and 336 to be placed on opposite sides of the module 94 resting on a supporting surface, such as a trailer or truck bed. The hydraulic cylinders 332 and 334 are then contracted so as to bring the rollers 335 and 336 into contact with the opposite sides of the cotton module 94. At the same time, the servo control valve 394 and the direction control valve 420 are both actuated so that they shift to the right from their respective neutral and normal positions, illustrated in FIG. 16, so that the drive motors 352 and 354 are respectively driven counter clockwise and clockwise to cause the rollers 335 and 336 to be likewise driven, as indicated by the curved arrows in FIG. 17, this rotation of the rollers aiding in their movement underneath, and into supporting relationship to, the module 94. The cotton module 94 is then supported on the module support rollers 335 and 336 in substantially centered relationship to, and spaced below the RFID reader 368. The module 94 is shown in a position wherein the inner tail section 108 of the wrapping material is located approximately between the 1:00 and 3:00 o'clock positions, with the RFID tag assembly 112 being located approximately at the 2:00 o'clock position.

Assuming that it is desired to unload the cotton contained in the wrapped module 94 onto a cotton feeding floor at a cotton gin, the module 94 is first rotated so that the wrapping material tail section 108 is placed at the top of the module, which is the desired position for having the wrapping slit at a bottom location of the module 94 since there is little possibility then that the loose tail section 108 will be separated from the remainder of the wrapping and become mixed with the cotton emptied from the wrapping onto the feeder floor. This rotation of the module 94 is accomplished by causing the roller 335 to be rotated in the clockwise direction, as indicated by the associated arrow in FIG. 18, with this rotation being affected by deactivating the direction selector valve 420 so that both of the motors 352 and 354 are driven clockwise when the servo control valve 394 is shifted to the right from its neutral position shown in FIG. 16. This causes module 94 to be rotated counterclockwise, as shown in FIG. 18, carrying with it the tail section 108 together with the attached RFID tag assembly 112, which results in the tag assembly 112 being moved into the view of the RFID reader 368, which emits a signal to the operator, whereupon activation of the servo control valve 394 is discontinued, thereby stopping rotation of the motors 352 and 354, with rotation of the module 94 then ceasing so that the loose tail section 108 of the wrapping material is located at a top region of the module 94.

The vehicle carrying the fork attachment 310 can then be driven to place the module 94 over the feeder floor of the gin where the wrapping material is either manually cut at the bottom of the module 94 so as to effect a slit through the wrapping material that extends the length of the module, or the vehicle carrying the fork device 310 is driven to cause the wrapping material, at a location at the bottom of the module 94, to engage a fixed knife 446 (FIG. 18) at an end of the feeder floor while the module is moved into a position over the feeder floor, this movement of the module 94 relative to the fixed knife 446 causing the wrapping material to be slit.

Once the wrapping material enveloping the module 94 is slit, as shown at 448 in FIG. 19, the rollers 335 and 336 are once again respectively rotated counterclockwise and clockwise. Simultaneously, the rollers 335 and 336 are caused to shift outwardly relative to each other, as indicated by the outwardly pointing arrows, with the rotation of the rollers 335 and 336 acting to power them from underneath the module 94. Upon the wrapping on the module 94 being slit, the compressed cotton expands so as to force the ends of the wrapping at the slit to separate and permit the cotton freed from the wrapping to fall out onto the feeder floor. Separation of the rollers 335 and 336, as indicated by the arrows in FIG. 19, is effected by activating the servo control valve 398 to shift to the left, as viewed in FIG. 16, so as to route fluid to the cylinder ends of the cylinders 332 and 334. With the wrapping material tucked around the rollers 335 and 336 manually or by other means, the rollers unwinds the wrapping from the module surface as the rollers power out from underneath the module 94. Once the wrapping is removed from the module 94, the vehicle carrying the fork attachment 310 is then driven to place the rollers 335 and 336 over a used wrapper recycling bin or receptacle where the rollers 335 and 336 are caused to be respectively rotated clockwise and counterclockwise so that the wrapper is deposited into the recycle bin, this rotational direction of the rollers being effected by actuating the servo control valve 394 so as to shift it leftward from its neutral position, shown in FIG. 16, while simultaneously actuating the direction selector valve 420 to shift leftward from its normal position.

It is here noted that a constant feed of cotton to the disperser hood at the end of the feeder floor, opposite to that where the modules 94 are deposited, is maintained if the modules are placed end-to-end. However, in some gin arrangements this requires a significant length of side boards to be attached to opposite sides of the feeder floor in order to keep the cotton contained on the feeder floor. By manually slitting the wrapping material instead of using the fixed knife 446, it is possible to deposit the cotton on the feeder floor at a location substantially closer to the disperser head if the fork attachment includes a fork support frame that is mounted for pivoting about a central pivot post, as disclosed in U.S. Pat. No. 3,106,305. for example, or about a pivot post located at one end of the fork support frame. This permits the fork attachment to approach from the side of the feeder floor and then to be turned 90° so as to orient the module 94 so that its longitudinal axis extends in the feeding direction of the feeding floor.

Figure 20:
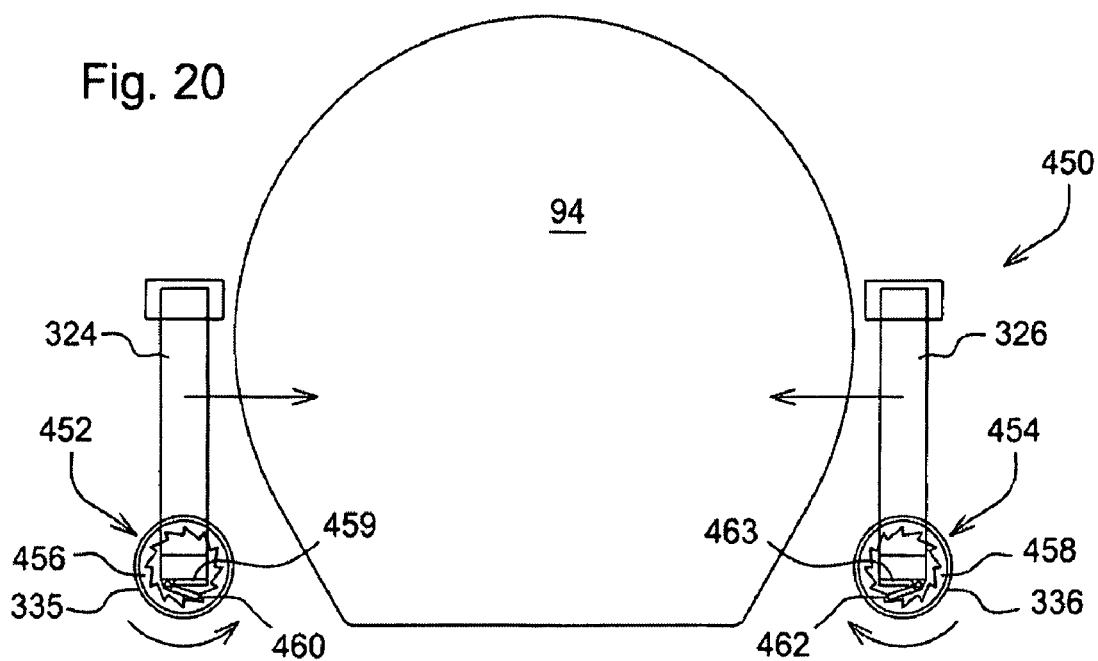
FIG. 20 is a schematic front view of a fork attachment which is a simplified version of the fork attachment shown in FIG. 14 in that it substitutes a ratchet mechanism for allowing the rollers to rotate in one direction, and omits the RFID reader, with the fork attachment being shown in a condition for engaging a module.

Referring now to FIG. 20, there is shown a portion of an alternate fork attachment 450, depicting how it differs from the attachment 310. Specifically, the fork attachment 450 is like the fork attachment 310 in all respects except that the RFID reader support structure 360 and the RFID reader are omitted along with the drive arrangement for the rollers 335 and 336. Such a simplified fork attachment can be used in situations where the loose inner tail 108 of the wrapper for the module 94 is placed other than in a lower region of the module when the module is deposited on the ground by the harvester 10 and that the module remains in a similar disposition when hauled to the cotton gin on a flat bed truck or trailer. Also, it is possible for the gin to be provided with a module handler in the form of a gantry located above the feeder floor and having opposite arms equipped with powered rollers capable of turning the module to properly locate the loose inner tail, with an RFID reader being mounted adjacent the top of the gantry so as to be able to read the RFID tag when it is properly positioned for permitting a bottom location of the wrapper to be slit to empty out the encased cotton. This reader would be coupled to a computer which gathers the information read so as to confirm the identity of the module and its order of coming across the feeder floor.

Replacing the drive arrangement are left- and right-hand ratchet arrangements 452 and 454, respectively, with the ratchet arrangement 452 including a ratchet ring 456 fixed to an inner surface of the roller 335 at an end region surrounding a rear region of the horizontal section of the fork 324, and with the ratchet arrangement 454 similarly including a ratchet ring 458 attached to an inner surface of the roller 336 at an end region surrounding a rear region of the horizontal section of the fork 326. Mounted to a plate 459, carried by the fork 324, for pivoting vertically is a pawl 460 disposed such that gravity acts to hold the pawl into engagement with the ratchet ring 456. In addition to gravity, a positive bias urging the pawl 460 into engagement with the ratchet ring 456 could be provided in the form of a coil torsion spring (not shown) acting between the fork 324 and the pawl 460 in the vicinity of the pawl pivot. Similarly, a pawl 462 is mounted to a plate 463, carried by the fork 326, for pivoting vertically and has an end biased into engagement with the ratchet ring 462 either by gravity alone or, in addition, by a coil torsion spring acting between the plate 326 and the pawl in the vicinity of the pawl pivot. The disposition of the pawl ring 456 and pawl 460 is such as to permit free, counter clockwise rotation of the roller 335, as indicated by the curved arrow, while the disposition of the pawl ring 458 and the pawl 360 is: such as to permit free, clockwise rotation of the roller 336.

Figure 21:
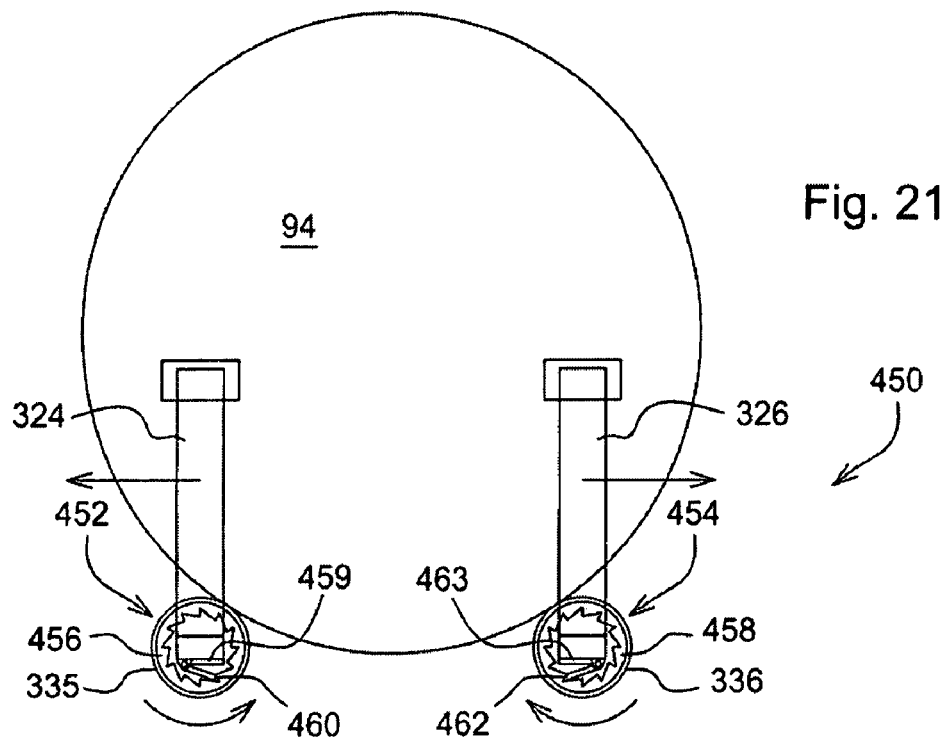
FIG. 21 is a schematic front view like that of FIG. 19, but showing the fork attachment in a condition for stripping a wrapper from the module.

As depicted in FIG. 20, the simplified fork attachment is brought into engagement with the cotton module 94 by first separating the rollers 335 and 336 a distance sufficient for permitting the rolls to straddle the module 94, which is resting on a supporting surface. When the rollers 335 and 336 come into contact with the opposite sides of the module 94, they respectively rotate freely in counter clockwise and clockwise directions, as permitted by the ratchet arrangements 452 and 454, and indicated by the curved arrows. Thus, the rollers 335 and 336 will be moved into supporting relationship to the module 94, as shown in FIG. 21.

The vehicle supporting the fork attachment 450 will then be driven so as to move the module 94 lengthwise relative to the stationary knife 446, at the end of the feeder floor at the cotton gin, so as to cause the wrapping to be slit by the stationary knife 446 located at the end of the feeder floor. As shown in FIG. 21, the rollers 335 and 336 are caused to be separated from each other by effecting extension of the hydraulic cylinders 332 and 334, as described above with reference to the operation of the fork attachment 310. Simultaneously, the loader arms, or other vertically movable structure supporting the fork attachment 450 are raised to move the rollers 335 and 336 upwardly along the periphery of the module 94. The ratchet arrangements 452 and 454 will now act to prevent rotation of the rollers 335 and 336 with the result that the rollers act to peel the wrapping off the module 94. The wrapping may then be manually or mechanically removed.

Thus, it will be appreciated that a convenient way to create wrapped cylindrical cotton modules 94 marked with RFID tags is to use supply rolls of wrapping material incorporating the tags together with a wrapping device used in conjunction with a module-forming arrangement embodied in the harvester for picking the cotton bolls. Further, it will be appreciated that the grapple attachment 134 and the fork attachment 310 are each capable of being operated to pick up cotton modules 94 resting on a support surface, such as the ground in a field, or the bed of a trailer or truck, which has hauled the module to a cotton gin, to identify the previously formed and marked cotton module 94 and to properly orient the module 94 for having wrapping material removed from its surface without an inner tail section 108 of the wrapping material ending up mixed with the cotton unloaded from the wrapping onto the cotton gin feeder floor. It will also be appreciated, that the alternate fork attachment 450 can be used in situations where it is not necessary to reorient the module 94 in order to place the loose tail section 108 of the module wrapper in a more desirous location for having the module wrapper slit at the bottom of the module.

Having described the preferred embodiment, it will become apparent that various modifications can be made without departing from the scope of the invention as defined in the accompanying claims.

The invention claimed is:

1. A grapple attachment for handing large cylindrical modules of cotton wrapped with a length of wrapping material having a loose inner tail section, said grapple attachment comprising: a support frame including a rear side, as considered relative to a forward direction of travel, provided with a coupling arrangement adapted for being connected to a mobile loader vehicle for elevating the grapple attachment; first and second roller support arrangements being coupled to said support frame; first and second roller arrangements respectively mounted to said first and second roller support arrangements; said first and second roller arrangements each including at least a first roller respectively mounted to each of said first and second roller support arrangements for rotation about first and second parallel axes; at least said second roller support arrangement being pivotally mounted to said support frame for movement relative to said support frame for moving said first roller of said second roller arrangement relative to said first roller of said first roller arrangement between a first position, wherein said first rollers are disposed for engaging an underside of a given module oriented parallel to said first rollers, and a second position, wherein the first rollers are separated from each other a distance for permitting said given module to pass between them; a powered actuator arrangement coupled between said support frame and at least said second roller support arrangement for selectively moving said second roller support arrangement relative to said first roller support arrangement so as to move said first roller of said first roller arrangement between said first and second positions; a drive arrangement coupled to said first rollers for selectively rotating said first rollers in opposite directions relative to each other for aiding movement of said first rollers beneath, and in supporting engagement with, said given one of the modules when said first roller of said second roller arrangement is being moved from said second to said first position wherein a combination of moving said second roller arrangement from said second position to said first position and powering the first rollers in opposite directions provides a means for lifting the module while producing minimal damage to wrapping material have been added.

2. The grapple attachment, as set forth in claim 1, wherein said drive arrangement is selectively operable for driving said first rollers of said first and second roller arrangements in the same direction, whereby said given module, when supported on said first rollers, will be rotated about a longitudinal axis of said module.

3. The grapple attachment, as set forth in claim 2, and further including an RFID reader coupled to said support frame so as to be at a location elevated above said given module, when supported by said first rollers, for reading an RFID tag attached to said given module when the module is positioned with said RFID tag in an upper location of said module.

4. The grapple attachment, as set forth in claim 1, wherein said first and second roller support arrangements include first and second forks mounted to said support frame, with at least said second fork being mounted for transverse shifting movement toward and away from said first fork; and said powered actuator arrangement being coupled to at least to said second fork.

5. The grapple attachment, as set forth in claim 4, wherein said first fork is mounted to said support frame for transverse movement relative to said second fork; and said powered actuator arrangement also being coupled to said second fork.

6. The grapple attachment, as set forth in claim 5 wherein said powered actuator arrangement includes a first extensible and retractable hydraulic actuator coupled between said support frame and said first fork, and a second extensible and retractable hydraulic actuator coupled between said support frame and said second fork.

7. The grapple attachment, as set forth in claim 1 wherein said drive arrangement includes at least first and second hydraulic motors respectively coupled to said first roller of said first roller arrangement, and to said first roller of said second roller arrangement.

8. The grapple attachment, as set forth in claim 1, being in the form of a grapple arrangement, wherein said first roller support arrangement forms an integral part of said support frame and defines a reversed, substantially C-shape, fixed grapple section, as viewed from the side; said second roller support arrangement forming an integral part of a movable grapple section having a substantially C-shape, as viewed from the side and having an upper end region mounted to an upper end region of said fixed grapple section for pivoting vertically about a horizontal axis; said first roller arrangement being mounted to a lower front region of said fixed grapple section; said second roller arrangement being mounted to a lower rear region of said movable grapple section; and said powered actuator arrangement being coupled between said fixed and movable grapple sections for selectively pivoting said movable section about said horizontal axis between a lowered closed position, wherein said lower rear end region of said movable section is disposed adjacent said lower front end region of said fixed grapple section; said first roller of said first roller arrangement being mounted to a lower front end of said fixed grapple section; and said first roller of said second roller arrangement being mounted to a lower rear location of said movable grapple section.

9. The grapple attachment, as defined in claim 8, wherein said roller arrangement includes at least a second roller disposed parallel to each said first roller and mounted to a lower end of said fixed grapple section; and said drive motor arrangement including a first drive motor coupled for driving each first roller, and a second drive motor coupled for driving each second roller.

10. The grapple attachment, as defined in claim 8, and further including an electronic RFID tag reader located at an upper region of one of said fixed and movable grapple sections, whereby said tag reader is adapted for detecting when an RFID tag located adjacent an inner tail of a wrapping, disposed about a cylindrical module supported by the grapple, is located adjacent said reader.

11. The grapple attachment, as defined in claim 8, and further including an endless chain cutter supported adjacent said first roller of said first roller arrangement and including an endless chain mounted for following a path extending parallel to said first roller and including at least one knife element for slitting open a wrapping disposed about a cotton module supported on said first and second rollers.

* * * * *